United States Patent
Kinawi et al.

(10) Patent No.: US 6,545,669 B1
(45) Date of Patent: Apr. 8, 2003

(54) OBJECT-DRAG CONTINUITY BETWEEN DISCONTINUOUS TOUCH-SCREENS

(76) Inventors: Husam Kinawi, #903, 2010 Ulster Road N.W., Calgary, Alberta, T2N 4C2 (CA); Kevin W. Nielson, 4007-5th Street S.W., Calgary, Alberta, T2S 2C9 (CA); Todd G. Simpson, 133 Edgebrook Court N.W., Calgary, Alberta, T3A 5A4 (CA); James A. Malcolm, 1116 Jamieson Avenue N.E., Calgary, Alberta, T2E 0L5 (CA)

( * ) Notice: Subject to any disclaimer, the term of this patent is extended or adjusted under 35 U.S.C. 154(b) by 0 days.

(21) Appl. No.: 09/466,121

(22) Filed: Dec. 21, 1999

Related U.S. Application Data

(63) Continuation-in-part of application No. 09/277,204, filed on Mar. 26, 1999, now Pat. No. 6,331,840.

(51) Int. Cl.7 ................................................. G09G 5/00
(52) U.S. Cl. ......................... 345/173; 345/1.1; 345/1.2
(58) Field of Search ................................. 345/173, 174, 345/175, 176, 177, 178, 179, 1.1, 1.2, 1.3, 2.1, 2.2, 2.3, 3.1, 3.2, 3.3, 3.4, 700, 728, 730, 769, 773, 778, 864, 733, 764

(56) References Cited

U.S. PATENT DOCUMENTS

| | | | | |
|---|---|---|---|---|
| 5,239,665 A | * | 8/1993 | Tsuchiya ..................... | 395/800 |
| 5,300,943 A | * | 4/1994 | Jakobs et al. ................. | 345/173 |
| 5,467,102 A | * | 11/1995 | Kuno et al. .................... | 345/1.1 |
| 5,579,481 A | * | 11/1996 | Drerup ................... | 395/200.01 |
| 6,118,433 A | * | 9/2000 | Jenkin et al. ................ | 345/173 |
| 6,229,502 B1 | * | 5/2001 | Schwab ....................... | 345/1.1 |
| 6,252,563 B1 | * | 6/2001 | Tada et al. .................... | 345/173 |

\* cited by examiner

Primary Examiner—Xiao Wu
(74) Attorney, Agent, or Firm—Sean W. Goodwin

(57) ABSTRACT

Apparatus and process are provided for dragging or manipulating an object across a non-touch sensitive discontinuity between touch-sensitive screens of a computer. The object is selected and its parameters are stored in a buffer. The user activates means to trigger manipulation of the object from the source screen to the target screen. In one embodiment, a pointer is manipulated continuously on the source screen to effect the transfer. The object can be latched in a buffer for release on when the pointer contacts the target screen, preferably before a timer expires. Alternatively, the object is dragged in a gesture or to impinge a hot switch which, directs the computer to release the object on the target screen. In a hardware embodiment, buttons on a wireless pointer can be invoked to specify cut, copy or menu options and hold the object in the buffer despite a pointer lift. In another software/hardware embodiment, the steps of source screen and object selection can be aided with eye-tracking and voice recognition hardware and software.

37 Claims, 21 Drawing Sheets

Prior
Art**

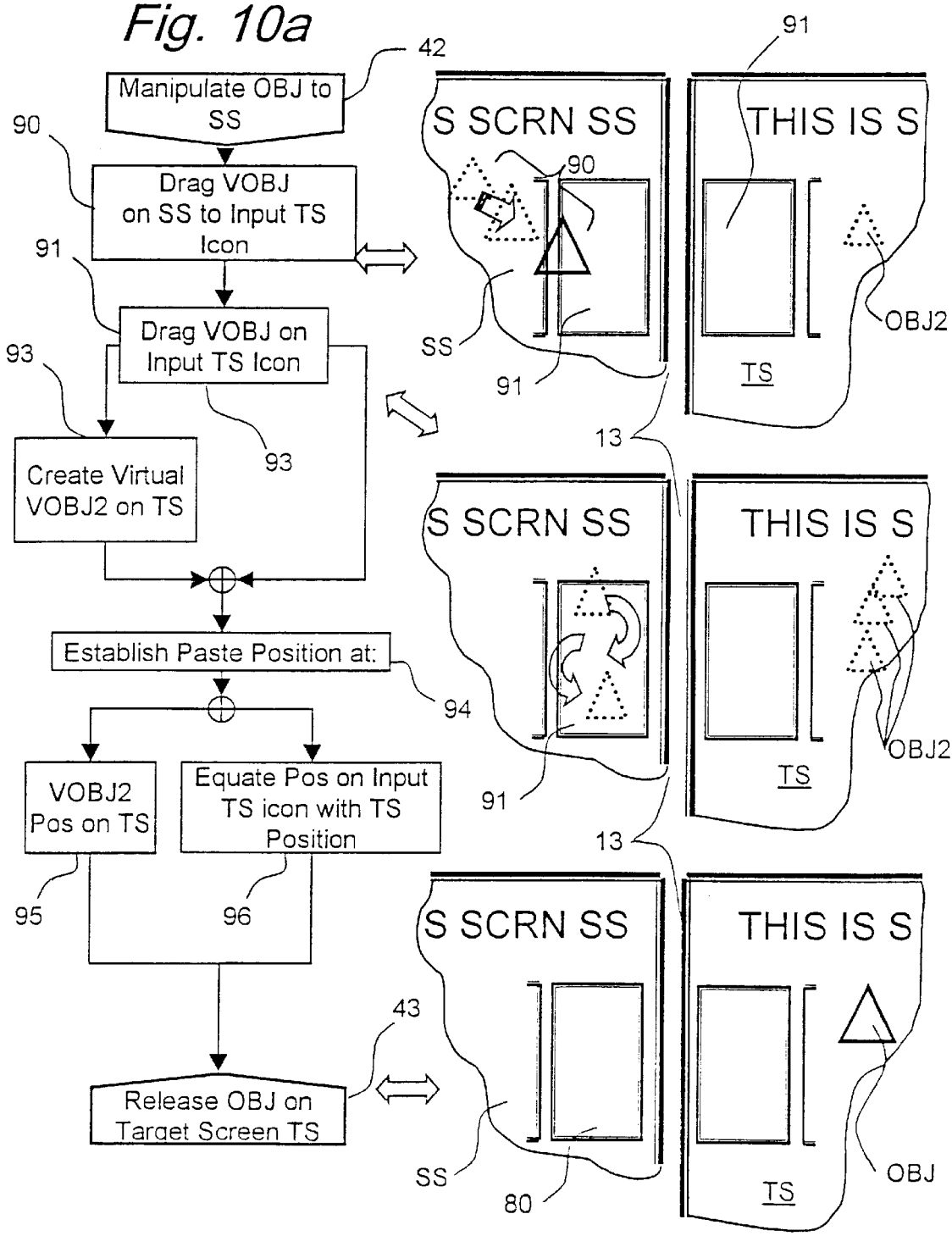

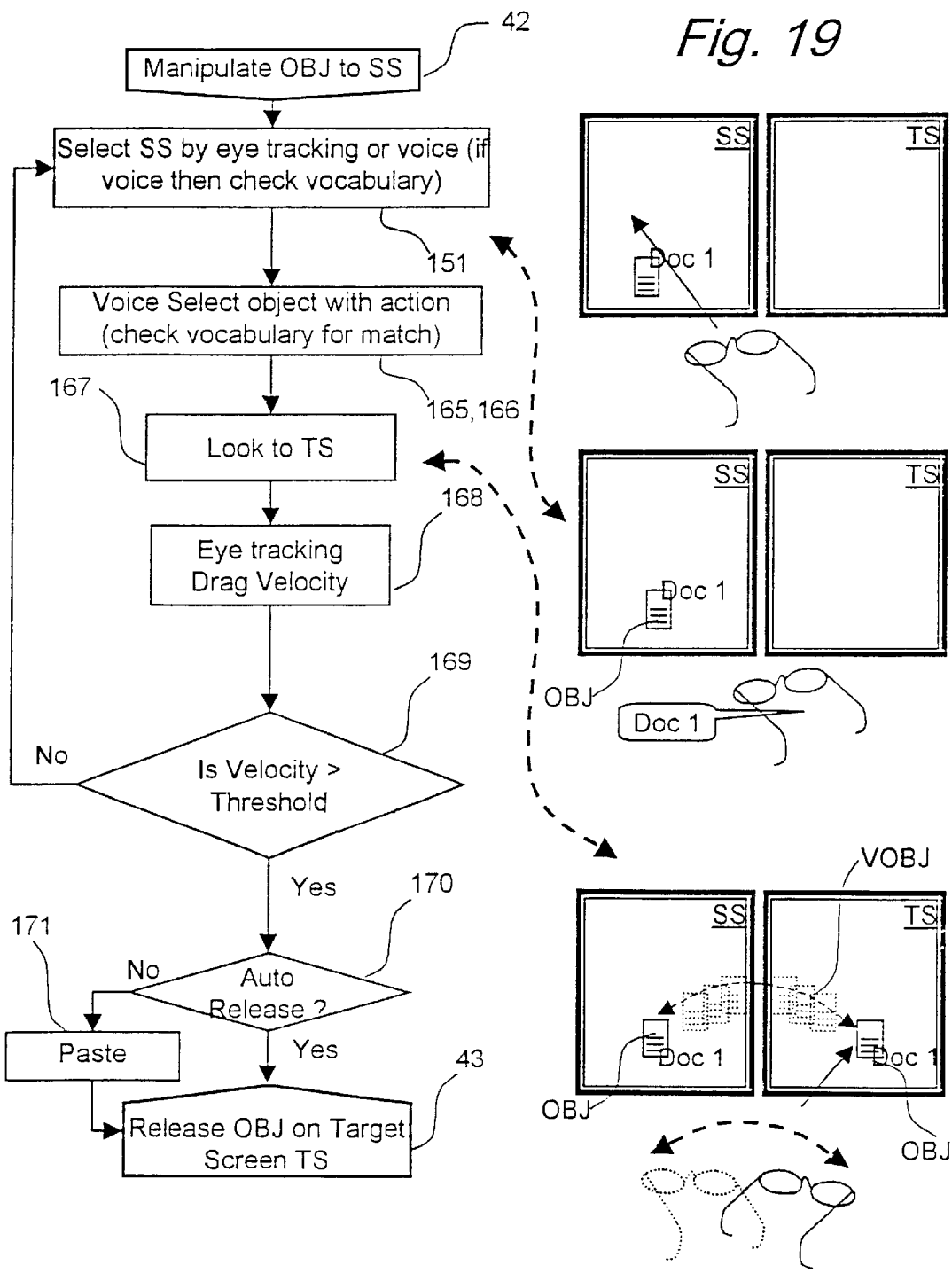

OBJECT-DRAG CONTINUITY BETWEEN DISCONTINUOUS TOUCH-SCREENS

This is a Continuation-in-part of application Ser. No. 09/277,204, filed Mar. 26, 1999 now U.S. Pat. No. 6,331,840.

FIELD OF THE INVENTION

The present invention relates to apparatus and process for manipulating displayed objects between display screens where there is a physical discontinuity between the screens but there is not a corresponding input interface continuous across the displays. More particularly, the displays are discontinuous touch-screens.

BACKGROUND OF THE INVENTION

Personal Digital Assistants (PDA) are microprocessor-based computers that emphasize their small size and personal information management capabilities. Conventional PDAs utilize a single screen which is touch sensitive to permit input functions. One screen is usually provided, the small size of which results in a limited input and output-working surface. Multiple screens can increase the user's effective, or virtual, screen real estate.

Electronic books are known to provide multiple screens (U.S. Pat. No. 5,534,888 to Lebby et al., U.S. Pat. No. 5,467,102 to Kuno et al., and U.S. Pat. No. 5,239,665 to Tsuchiya). Multiple screens are known which can display a single virtual (or linked) image (Kuno). In U.S. Pat. No. 5,579,481 to Drerup, networked computers use a wireless stylus and standard CRT screens to enable files to be moved from one networked computer to the other through application of the stylus to the screen. The stylus has an identifier and when applied to screen A, the selected file is associated with the unique ID of the stylus. Later, if the stylus is applied to a second screen B, the computer for screen B recognizes the ID of the stylus, remembers the file associated with it and then retrieves the file through the network from the computer associated with screen A.

Note however, that this approach to maintaining continuity is not feasible for Personal Digital Assistants that have multiple and discrete touch-screens and use a stylus, pen or even a finger.

As described in greater detail below, known input devices include touch-screens, touch-pads and digitizers. All use basically the same grid construction to sense the co-ordinates of the user's input through a pointing device, be it a stylus or fingertip.

Touch-screen displays have been introduced and widely used due to their intuitive interface and low-cost. Computers with touch-screen displays regard the operator's fingers or a hand-held stylus as the pointing device that manipulates the touch-screen's display's surface.

Computers with multi-displays are known where the nature of the application requires greater screen real estate (e.g., CAD applications) or the ability to have multiple entry points (e.g., machine-code debuggers). Typically these computers use standard pointing devices like a mouse or a digitizer for input. These standard pointing devices utilize a flat, continuous surface which software maps to the displays' entire real estate.

Through software, the displays are mapped either to a single virtual desktop or to multiple desktops. The pointing device moves continuously through the entire virtual desktop. Using a display presented in multiple discontinuous display surfaces, and using a continuous pointing device surface which is mapped to the entire display, users can drag, transfer and manipulate objects across the multiple displays because the pointing device itself never crosses a discontinuity in the input surface. An example includes a digitizing pad linked to multiple drafting station screens.

Multiple screens, which are capable of displaying a single virtual image, and which also utilize touch-screen input, are not known to the applicants. There is a complexity in building intuitive user interfaces if the displays are mapped to a single virtual desktop and the user needs to move and manipulate objects across the multiple displays. This complexity results from the fact that there is a physical discontinuity in the 'pointing device surfaces' requiring a lifting of the stylus when moving from screen to screen. This is further complicated in the situation where, in graphical user interfaces (GUI), it is common to select an object (e.g. an icon representing a file, a text or graphic clip, etc.) and drag it to a specific location on the screen (e.g. a "trashbin" icon for deleting the file object).

With the conventional single, continuous screen, which doubles as an input surface, a user may easily identify or select the object by touching it with a pointing implement or device. Then in a continuous movement the user may drag the object across the surface of the display (maintaining contact between screen and the pointing device) and release the object once there, such as by lifting the pointing device. However, as stated, with foldable multiple screens, it is currently necessary to use individual screens separated by a physical discontinuity therebetween. Thus, one cannot maintain this continuous movement of the stylus without losing contact between the screen and stylus and accordingly release or lose the object when crossing the discontinuity.

SUMMARY OF THE INVENTION

Apparatus and process are provided which overcome the limitations of touch-screens and pointer-based object drag when faced with a screen discontinuity. A variety of preferred embodiments are disclosed herein, all of which have the user selecting an object which causes it to be stored in a buffer and, without interacting with the target screen, triggers a manipulation from a source screen to the target screen so that the buffer contents are released there.

In the preferred embodiments, a pointer is used to drag the selected object and remain continuously on the source screen while also effecting transfer to the target screen. The pointer is monitored: to evaluate when an object was last selected (for employing a countdown timer), to determine its movement (for establishing its velocity or for performing predetermined gesture); or to determine its coordinates (for impinging a hot switch or a boundary). For more fluid manipulation preferred by some users, a combination of eye tracking and voice recognition can be used to identify the active screen, to select an object or set a cut-copy flag.

Accordingly in a broad aspect, a process for manipulating a first object between discontinuous source and target screens of a single virtual display of a computer is provided. The first object is being displayed on the source screen and is known in the virtual display by unique parameters. The novel process comprises the steps of:

(a) selecting the first object from the source screen;

(b) storing the first object's parameters in a buffer when it is selected;

(c) performing a source screen manipulation of the first object for transferring it from the source screen to the target screen; and (d) releasing the first object's parameters from the buffer for display of the transferred first object to the target screen.

Preferably, the source screen is a touch-screen and the on-screen manipulation comprises latching the object in a buffer when selected or dragging the object to a source screen-located hot zone. More preferably, the hot zone is a specialized icon or a screen boundary. Yet another preferred manipulation is dragging the object in a predetermined gesture or dragging the object above a pre-determined threshold velocity. The velocity techniques are preferably incorporated into the gesture and boundary steps for validation of the user's intent.

The above process is achieved using a novel combination of apparatus comprising a pointer for selecting the first object on the source screen, a computer memory buffer for storing the first object's parameters when it is selected and manipulation means or a trigger, preferably a latch timer, hot zone, velocity or boundary contact determination, associated with the source screen which, when activated by the user, manipulate the first object from the source screen to the target screen; and finally a release means, preferably automatic with the manipulation trigger for releasing the first object's parameters from the buffer for display of the first object on the target screen. The apparatus preferably includes flags which are set to determine if a cut or copy action has been selected, so that the object can be deleted from the source screen if a cut flag was set.

In another preferred apparatus aspect, a wireless stylus is provided as a pointer. The status of buttons on the pointer are relayed to the computer and can ensure that the object parameters are latched in the buffer despite a lifting of the pointer to cross the discontinuity. In yet another preferred aspect, eye-tracking and voice recognition can be incorporated to assist in object selection and drag across a discontinuity.

BRIEF DESCRIPTION OF THE DRAWINGS

FIG. 10a is a detailed flow diagram of another form of a Scroll Icon implementation of the hot switch embodiment according to FIG. 5;

FIGS. 14a and 14b are object cut and paste implementations and FIGS. 14c and 14d are object copy and paste implementations;

FIG. 19 is a flow diagram of an alternative eye-tracking and voice recognition implementation of the dual-screen continuity process.

DETAILED DESCRIPTION OF THE PREFERRED EMBODIMENT

Figure 2:
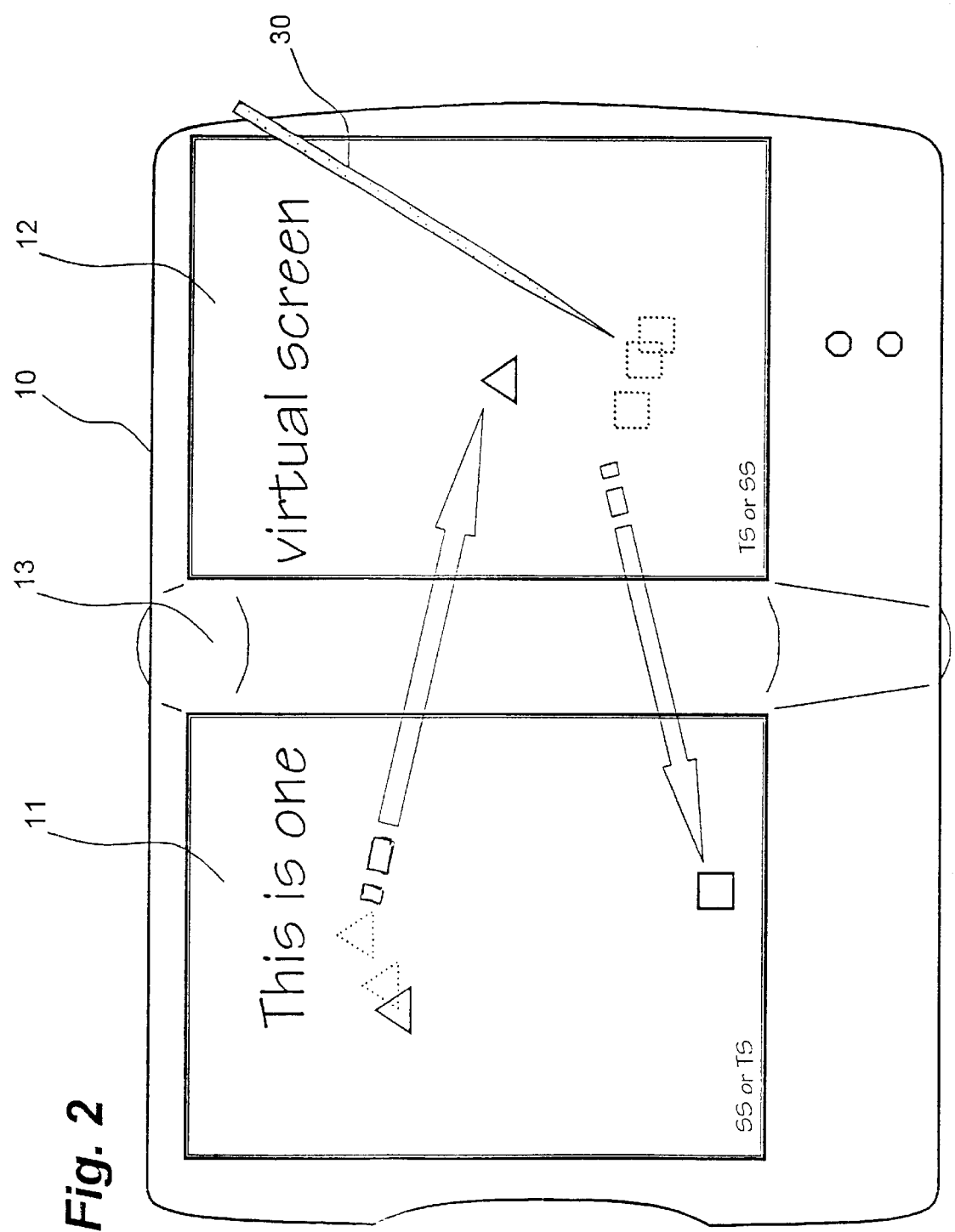
FIG. 2 is a diagrammatic view of a PDA, opened for use and having two touch-screens with a discontinuity (a hinge) therebetween. A single virtual desktop is shown having a stylus dragging a triangular object left to right across the intermediate discontinuity, and a square object dragged right to left; these actions being impossible without the use of the invention disclosed herein.
Figure 3:
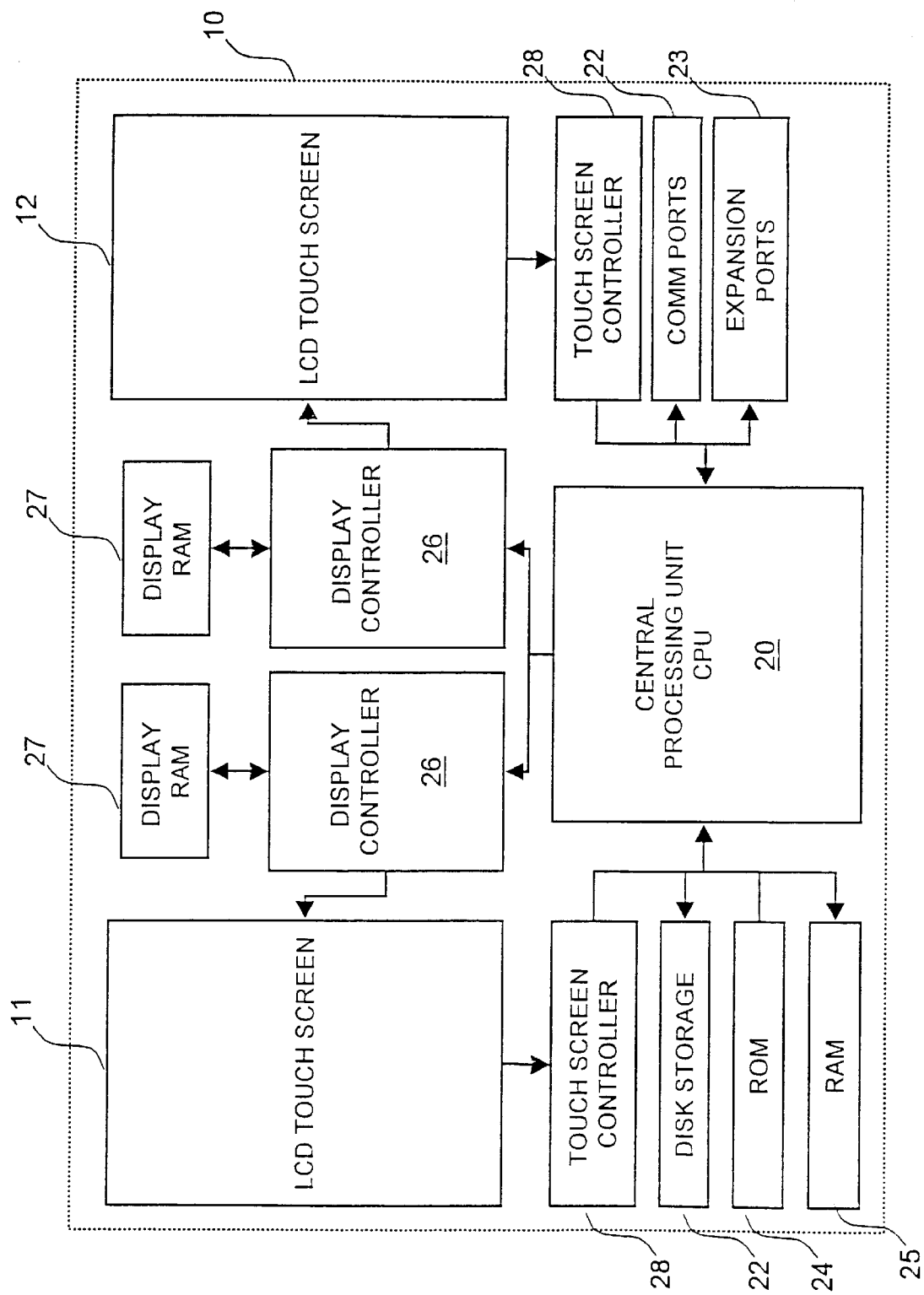
FIG. 3 is a flow diagram of the individual components of a dual screen PDA.

Several embodiments are disclosed which compensate for and overcome the difficulties associated with having two or more physically discontinuous 'pointing device surfaces'.
Touch-Screens As shown in FIGS. 2 and 3, a PDA 10 is shown having left and right screens 11, 12. Both screens 11, 12 are touch-sensitive screens (touch-screens) which provide a dual role; firstly being to display, and secondly acting as the pointing device surface. The screens are discrete for several reasons: to use smaller, less expensive touch-screens or to incorporate them into two halves of a folding portable computer. In FIG. 2, the two screens are physically separated by a hinge or discontinuity 13. The methods and apparatus for the manipulation of objects Δ,□ from screen 11, 12 to screen 12,11 are novel. As illustrated in FIG. 2, objects are routinely moved back and forth from screen 11, 12 to screen 12,11. For simplifying the figures of the disclosure, the description refers mostly to the manipulation of objects Δ,□ from the left screen 11 or source touch-screen (SS) to the right 12 or target screen (TS) which is likely also a touch-screen. As shown in FIG. 2, it is understood that the opposite manipulation is also usual.

The dual screens 11,12 display either two parts of one virtual screen or act as two distinct screens, displaying independent information. The point being that at some time, a user will desire to move an object from a source touch-screen SS 11 to the target screen TS 12 across the discontinuity 13 which does not support user input.

PDA Computer

Having reference to FIG. 3, the computer 10 comprises a CPU 20 and a bus which supports various communication interfaces 21, data storage devices (disks) 22, expansion ports 23, system ROM 24 and RAM 25. The PDA 10, through its CPU 20, ROM 24 and programming operates using an operating system. The CPU 20 and operating system manages the input and output interfaces, such as the touch-screens 11,12 and displays respectively. The PDA 20 is capable of running application programs including higher level programs for data management, and for integrating optional input interfaces such as voice recognition and eye-tracking.

The CPU 20 interfaces a display controller 26. Two display controllers 26,26 are shown—one for output to each of the two screens 11,12. Each display controller 26 has its own display RAM 27,27 and interfaces with the LCD display panels 11,12. The CPU 20 and the display controllers 26 direct which of the two screens 11,12 form part of the virtual screen. Two touch-screen controllers 28,28 relay input from the touch-screens to the CPU 20.

The two touch-screens 11,12 are operated by contacting the screens with a pointing device or pointer 30. In a specific embodiment disclosed below a wireless stylus is provided which permits wireless communication between the stylus and the PDA 10. Otherwise, it is understood that the term pointer 30 is to be interpreted in the context of the embodiment being described and can equally apply to any a "smart" wireless stylus or a "dumb" pointing device including a plastic stylus, pen or fingernail.

System and Application Programs

Both system and application programs monitor, instruct and handle all the screen input, display, memory transactions including clipboard or other memory buffers. No software is described herein as the programming necessary to provide the process and apparatus to achieve the operations described herein can be executed in many different forms by those of ordinary skill.

Object Drag Generally

It is understood that drag and drop, cut, copy, move and paste functions are the colloquial terms for a background application program or process performed by the operating system. For example, as shown for on-screen drop of the prior art of FIG. 1, for a single touch-screen, it is conventional to select an object at a first location, drag it about the screen to a second location and release or drop it there. The dragging is performed by continuous contact between the pointer and the screen, with the object dragged at the point of contact. Depending on the status of a cut/copy flag, the original object may be deleted after release.

Conventionally, moving an object is typically known as 'drag and drop'. By tapping a pointer on the surface of a touch-screen, the user can highlight and select an object. Once selected, the objects parameters are stored in an object buffer (e.g., the operating system clipboard). Usually a phantom or virtual image of the object is formed and the user can move the selected virtual object about the screen using a variety of techniques. For example, it is conventional for a user to move the pointer about the screen while maintaining contact with both the screen and the selected virtual object for dragging it. The object is dropped by signaling its release such as by lifting the pointer, or using some other trigger.

Known cut/copy and paste functions are merely an extension of the move described above. In a copy operation, a copy of the object remains at the first location and a copy is pasted at the second location, the copied objects having the same parameters except for location, the parameters being known by the computer and which describe that unique object. In a cut and paste operation, while the object seems to have been deleted from its former location, the object's parameters have merely been updated as to the object's pasted location.

With dual displays and dual touch-screen pointing surfaces 11,12 described herein, conventional dragging of an object from a source screen SS to a target screen TS would require lifting of the pointer 30. It is clear that, as with the prior art, lifting of the pointer 30 at the discontinuity 13 releases the object as contact is lost with the touch-screen and with the object. In the present invention, methods are provided to ensure that continuity is maintained during object drag to the other screen TS.

Basics of the Novel Continuous Drag

Both software and hardware solutions can implement the novel process steps. In one embodiment, a software-based solution is provided as an extension to an operating system shell. In another embodiment, a combination hardware and software-based solution integrates the use of eye-tracking, voice recognition, or a two or three-buttoned wireless stylus.

While object identification and location selection are conventional features of a GUI operating system, an operating system shell extension is provided to enhance a typical operating system (such as Windows CE, available from Microsoft Corporation, Redmond, Calif.) to support multiple touch-screen displays.

Operating system shell extensions that support touch-screen multiple displays include:

- state-saving: this will save the state information of where a pointer last touched one of the displays or upon which screen a user had just gazed;
- object buffer: this enables temporary storage of object parameters including its unique ID, start location on the display—may be the operating system clipboard;
- voice recognition for matching vocabulary with specific actions;
- gesture-recognition: this determines dynamic state information of the pointer/touch-screen contact including gesture velocity (speed and last known direction vector) and identifying and uniquely categorizing a two-dimensional touch gesture—akin to handwriting recognition, and
- timer: this counts beginning from the time an object is selected, such as the last time a pointer touched a display.

The operating system shell extensions assist in solving the problem of having physically discontinuous pointing device surfaces in the transfer of an object through cut/copy/paste functions.

Figure 1:
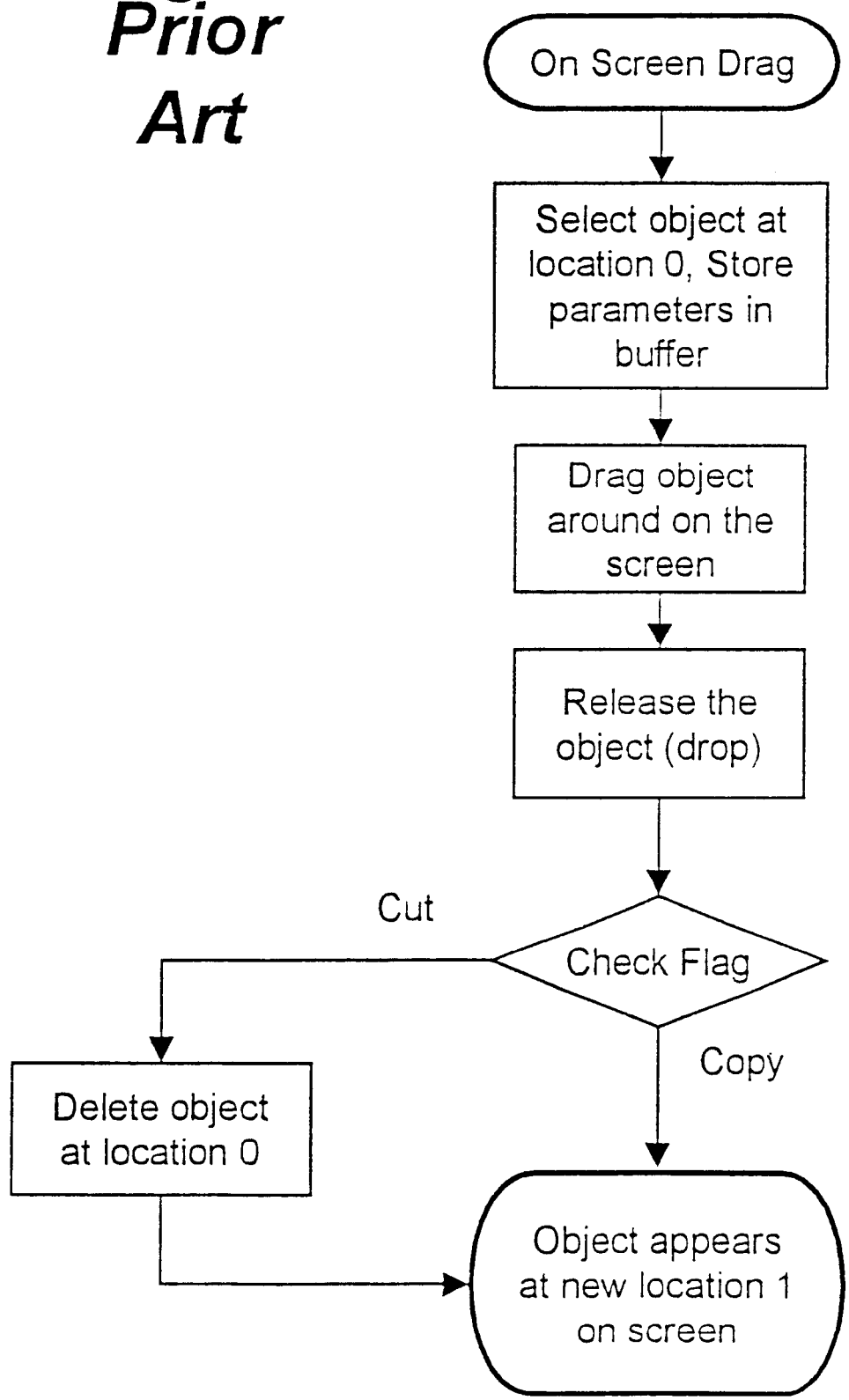
FIG. 1 is a flow diagram of a prior art process of object drag and drop on a single screen.
Figure 15:
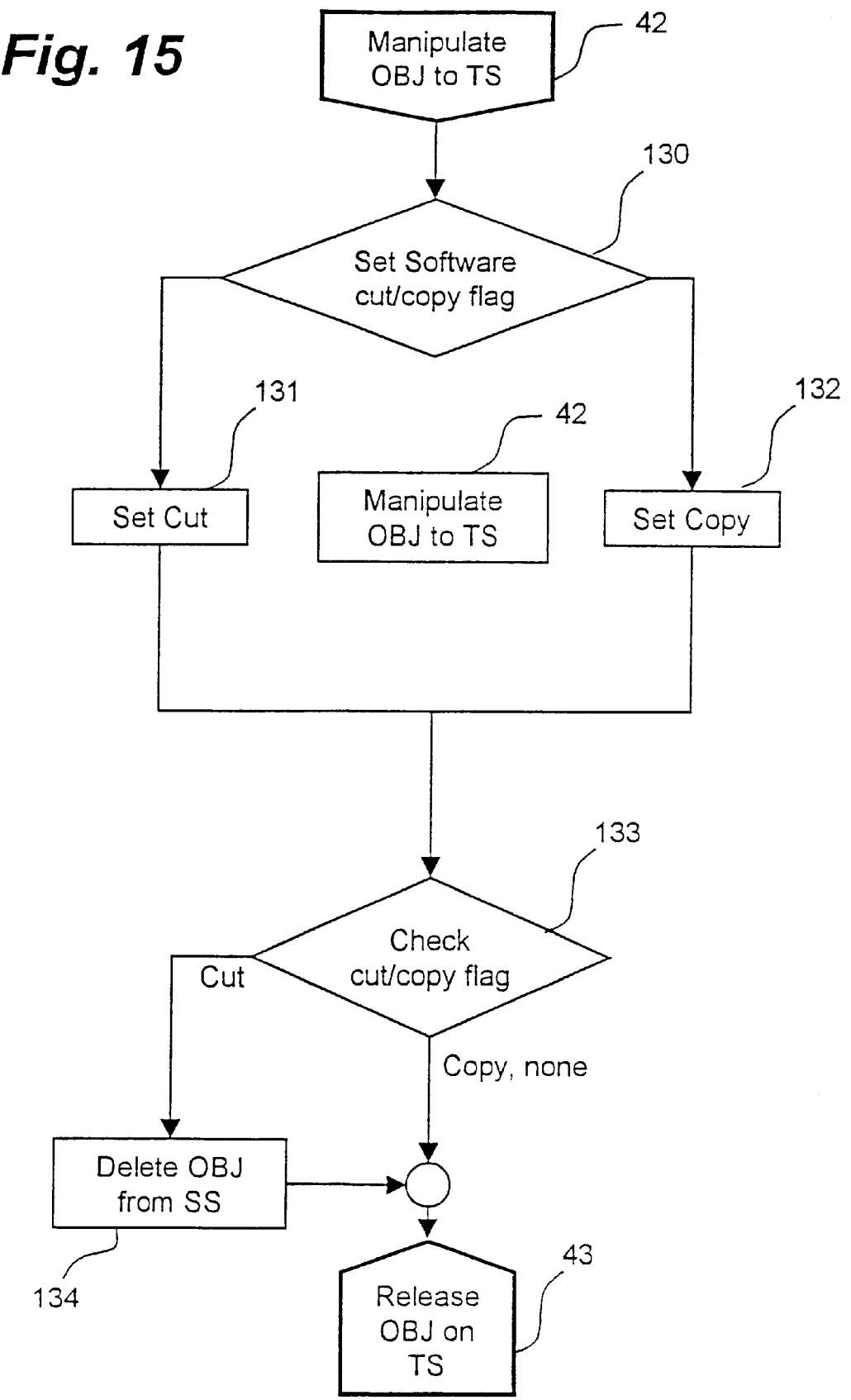
FIG. 15 is a flow diagram illustrating a software implementation for setting and then testing for a cut or copy flag when releasing the object.

As shown for both the prior art in FIG. 1 and the present invention in FIG. 15, a cut/copy flag is usually set before release, for determining the fate of the original object once the move is complete. If the flag is not set at all, a default function is deemed—typically a failsafe 'copy' if the move is between physical storage 22,22 and between file directories on a single disk 22, usually to 'cut'.

Root Elements

Figure 4:
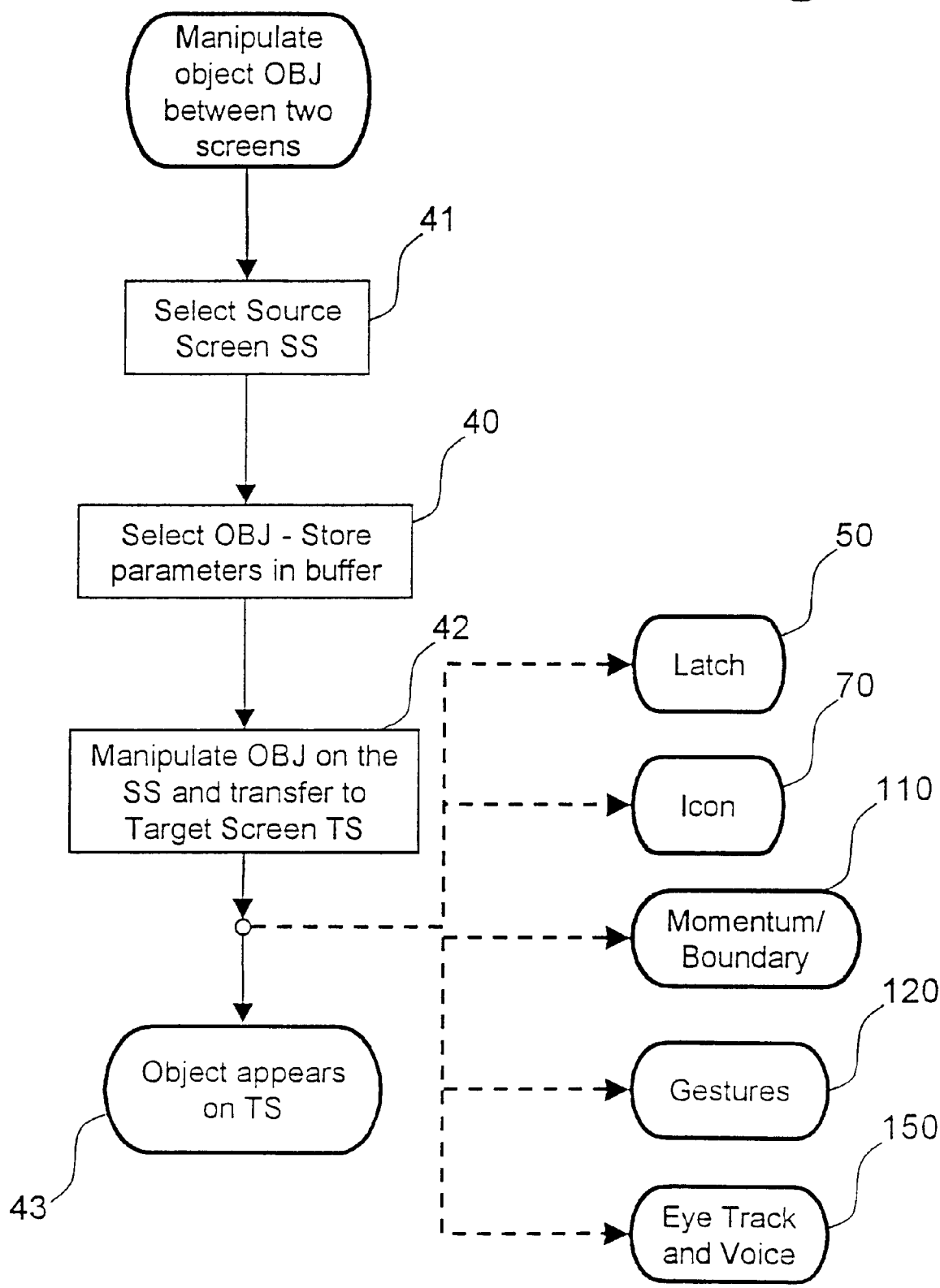
FIG. 4 is a flow diagram of an object drag process manipulating an object across a discontinuity according to the invention.

Having reference to FIG. 4, the inventive process enables manipulation of an object 42 across a physical discontinuity 13 in the input surface, such as a hinge between two screens SS,TS. Generally the process comprises: selecting an object (OBJ) 40 on a source touch-screen (SS) 41 for temporarily storing its parameters in a memory buffer. The object parameters in the buffer are usually displayed as a virtual object (VOBJ) for visual feedback of the state of the process. The object VOBJ can be dragged about while the original object OBJ remains anchored until the action is complete. References herein to OBJ generally refer to the original displayed object or its parameters in the buffer. Virtual object VOBJ is representing the temporary displayed buffer contents being manipulated.

For FIGS. 6–17, the preferred means for selecting a source screen or an object is by contacting a pointer 30 to the touch-screen SS or object respectively. For FIG. 18—Y, the means for selecting is a combination of eye-tracking for selecting the source SS or target screen TS, or voice recognition algorithms for selecting screens, objects and manipulating the object 42.

Means used to facilitate manipulation of the object across the discontinuity 13 comprise software or hardware means which include trigger means to facilitate the manipulation, while remaining on the source touch-screen, positioning means to establish the paste point and release means for ultimately pasting the object parameters OBJ on the target screen TS 43. The manipulation 42 can be accomplished through several embodiments including through software and hardware or a combination thereof.

Throughout the description of the preferred embodiment, it is understood that release of the object's parameters OBJ on the target screen TS can occur automatically and immediately upon the target screen TS being selected, the object being automatically pasted to a predefined location thereon or the location is inherent in the selection. The description herein concentrates on the novel process for ensuring the user can manipulate the object 42 across the user's discontinuity 13 to the target screen TS. Once the object OBJ appears on the target screen TS 43, conventional drag and drop techniques can be employed to reposition the object (see FIG. 1 Prior Art). Alternatively, novel drag operations upon release of OBJ on the target screen TS can be incorporated automatically with the manipulation.

Integral with the use of a display which doubles as the input or pointing interface is the challenge to select the object OBJ on the source touch-screen SS 41 and then trigger manipulation of the object to the target screen TS 42 with some unambiguous action. Having reference to FIGS. 4, 4b, such an action includes use of a trigger of some sort to initiate the manipulation 42 while maintaining continuity. Examples of triggers include mere selection of the object coupled with a software latch-timer 50, directing the object onto a specialized icon located on the source touch-screen SS 70, directing the object with sufficient momentum or at a boundary of the source touch-screen SS 110, performing a predefined gesture 120, or a combination of eye tracking and voice recognition 150.

Latch

Figure 5:
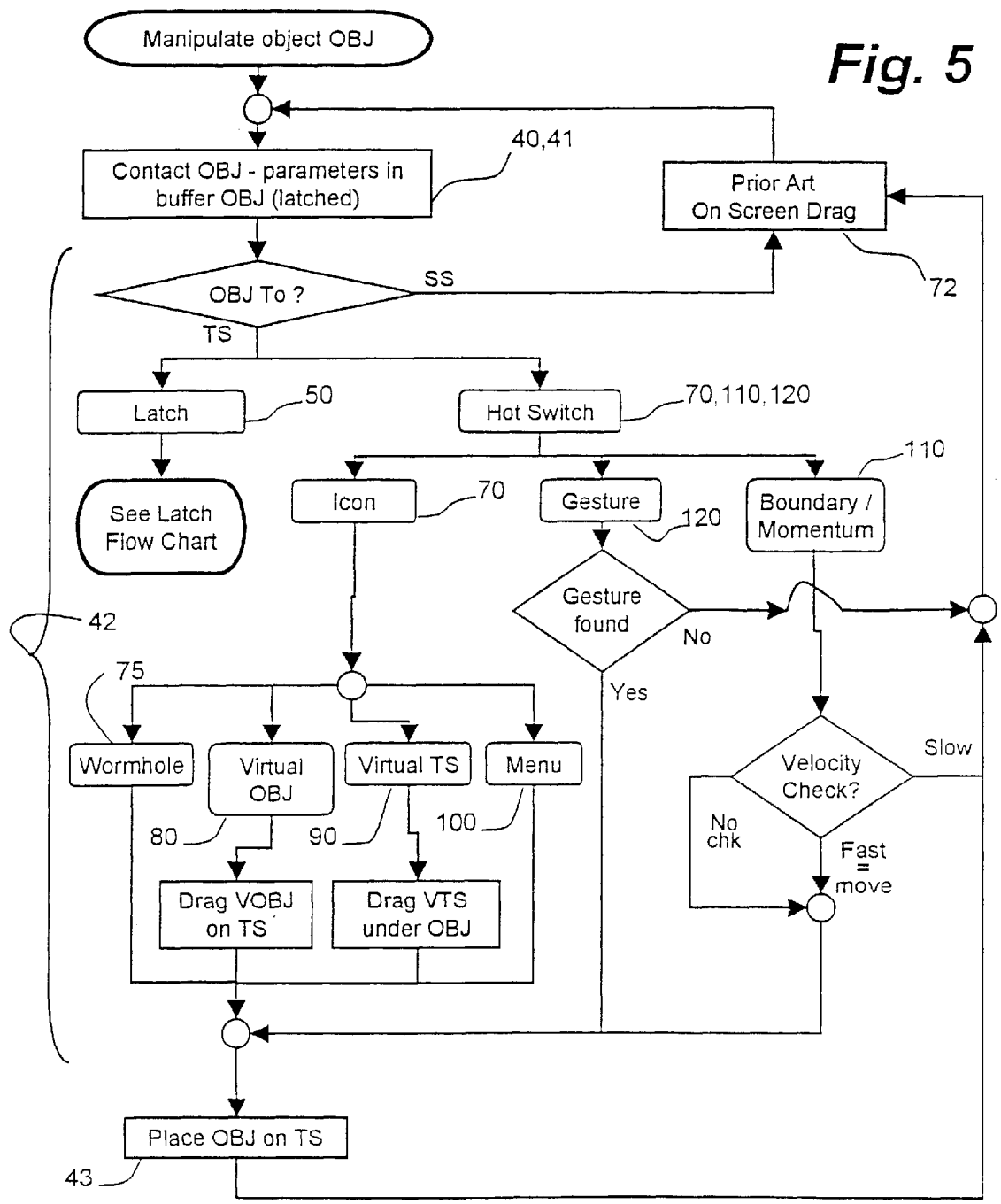
FIG. 5 is a generalized flow diagram of a software implementation of a hot switch for manipulating an object across a discontinuity according to the invention, specifics being illustrated in additional figures.
Figure 6:
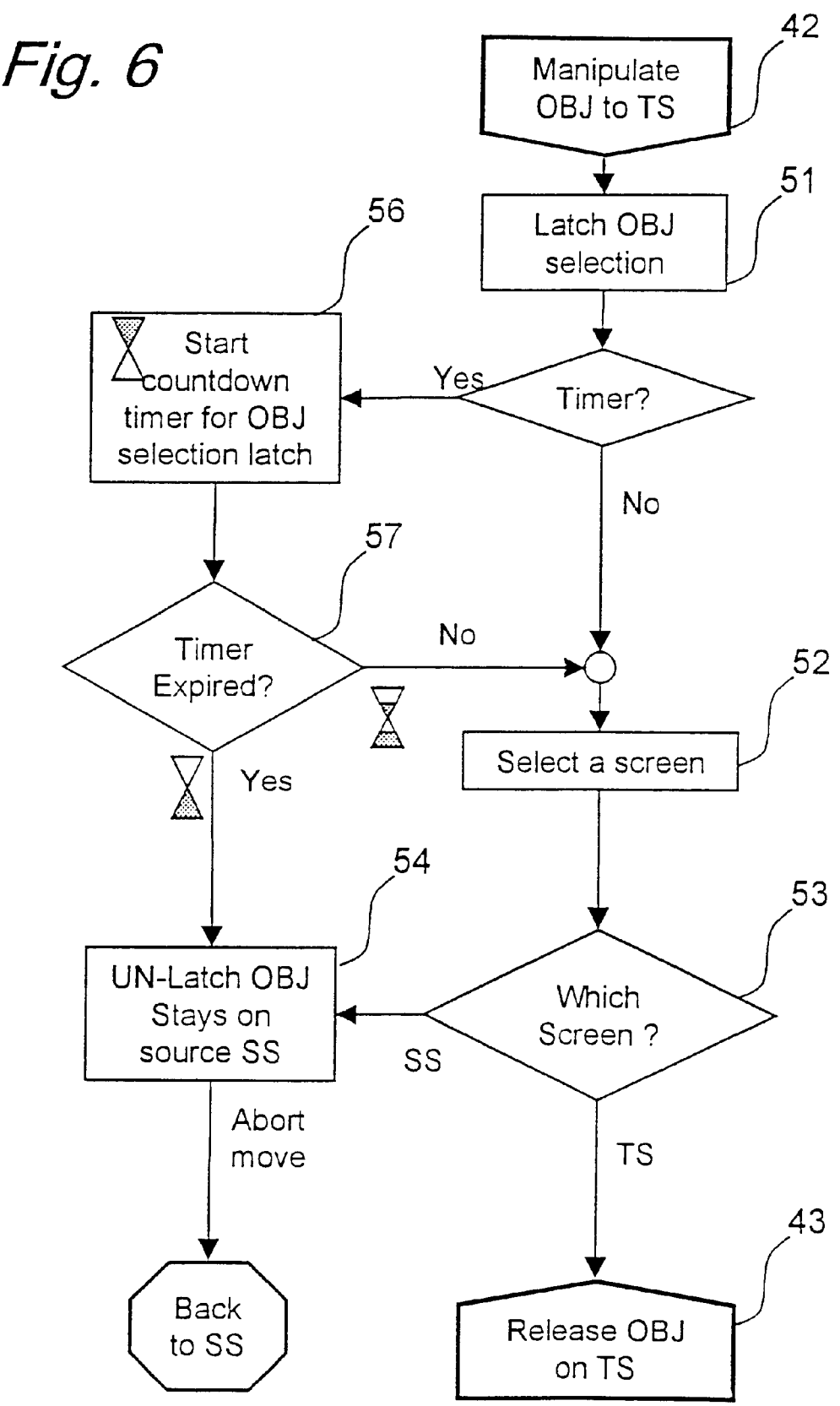
FIG. 6 is a flow diagram of a software implementation of latched timer embodiment of the process of FIG. 4.

In the simplest embodiment, as shown on FIGS. 4b and 5, during a latch manipulation 50, once the object OBJ is selected 40 from the source touch-screen SS 41 and stored in the buffer, it is latched therein 51. Despite intervening ambiguity, such as by lifting of a pointer 30, object OBJ is not in fact released from the buffer until a screen is selected 52, such as by contacting it with the pointer 30. If it is determined 53 that the source touch-screen SS is re-selected 54, then the object OBJ is merely released thereto, as an aborted manipulation. If the target screen TS is selected 55, object OBJ is released thereto, completing the latch manipulation 50.

The latch can be associated with a countdown timer 56. In this case, once the object OBJ is latched 51 the countdown timer 5 is started. In order for object OBJ to be released to the target screen TS 55, the user must select 52 the target screen TS before the timer expires 57. Else, object OBJ is unlatched 54 and the object OBJ reverts to its original location and status on the source touch-screen SS.

Figure 7:
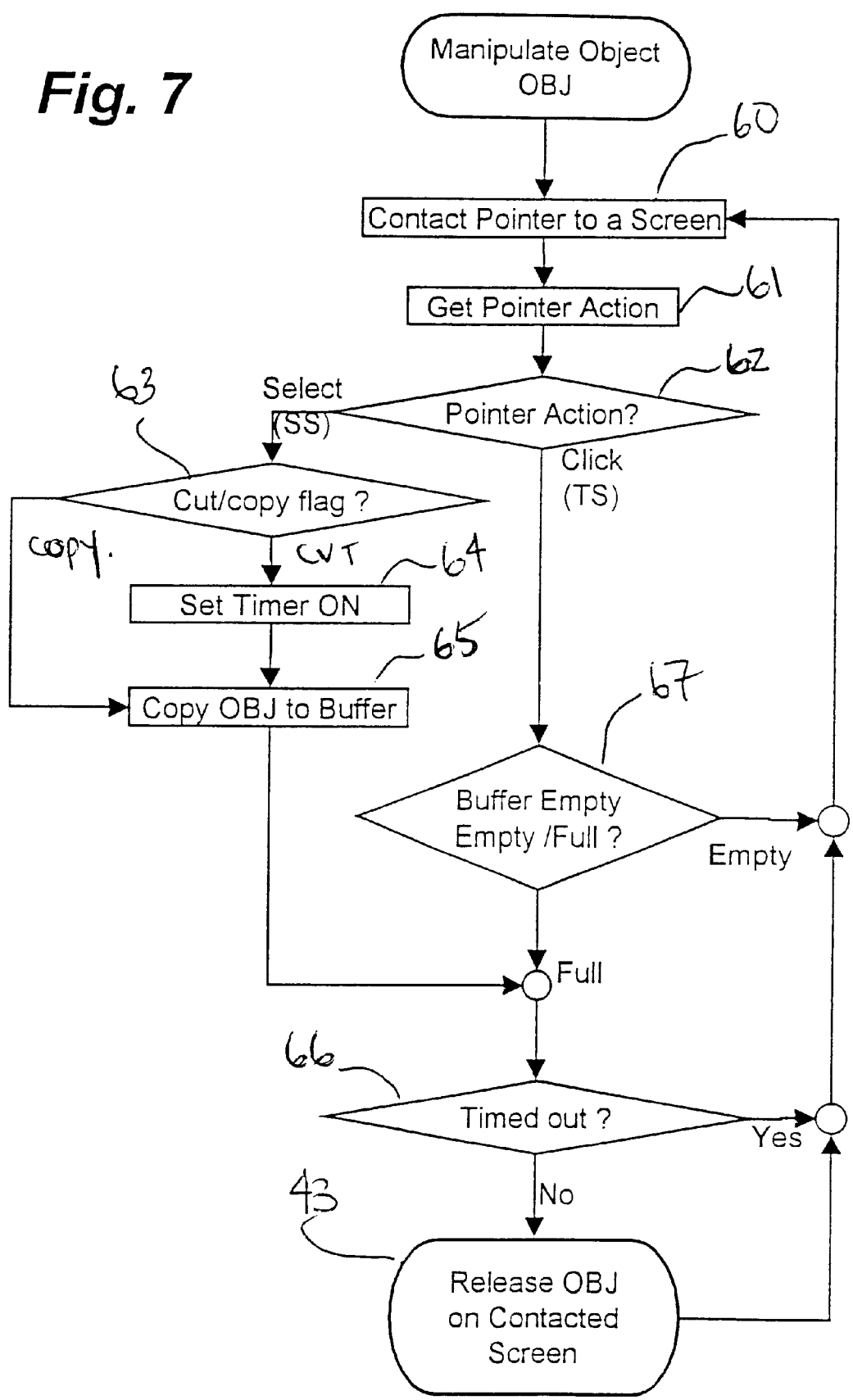
FIG. 7 is a flow diagram illustrating the preferred use of operating shell extensions to achieve the process according to FIG. 6.

In the context of using a pointer 30 for selecting screens and objects, as shown in FIG. 7, several operating shell extensions are repeatedly employed in achieving this result, including monitoring status of the pointer and buffer, a timer and checking for cut or copy flags. The system monitors when a pointer 30 contacts the screen 60. The computer 10 gets an action associated with the pointer contact 61. If the pointer action at 62 is to select an object on the source touch-screen (such as by a contact and drag action) then a cut/copy flag is checked 63. One safe approach is to activate a timer 64 only if a cut action is selected. If either a cut or copy action, the object parameters are copied to the buffer 65. Now the buffer is full and further pointer action can continue as long as the timer hasn't expired or timed out 66. At any point later, if the pointer action is to paste or click on the target screen at 62, then the buffer is checked 67. If the buffer is full then an object is present and can be pasted. If the timer was running and hasn't timed out 66 then the object is released 43. If the timer expired, then the buffer is released, the buffer is emptied and the user is required to re-select at 60. If the buffer was empty at 67, then there was no action in progress and the user is invited to continue to try again at 60.

Hot Switch

Turning again to FIG. 5, in second embodiment, a hot switch 70,110,120 is used to trigger the cross-discontinuity manipulation 42. An example of the triggering means or hot switch is either a specialized icon occupying a zone located on the source touch-screen SS 70, a detected contact with a screen boundary 110 or a gesture 120. The rate of change of position or velocity of the pointer 30 can also be monitored, such as during a gesture 120, when dragging generally, or when interpreting the nature of a boundary contact 110.

FIG. 5 illustrates an overall flow screen of the hot switch as a trigger for the manipulation 42. As illustrated, once selected, 40,41 and with continued contact between the pointer 30 and the source touch-screen SS, the user chooses where virtual object VOBJ is to be manipulated; the source touch-screen SS (which is not novel and merely FIG. 1 for on-screen drag) or to the target screen TS using the novel latch 50 or hot switch 70,110,120 approach. The latching embodiment is indicated in FIGS. 4, 4b, but is detailed more fully in FIGS. 6 and 7.

In the instance of a specialized icon 70, the virtual object VOBJ is caused to be manipulated to the target screen TS 42 without having to physically move the pointer 30 there. As introduced in FIG. 5, and illustrated in more detail in FIGS. 8,9,10a, and 10b, several possible icon hot switch implementations are disclosed, such as a wormhole icon 75, a virtual object on the target screen TS 80, a virtual target screen on the source touch-screen SS 90 and a menu icon of options for setting cutcopy flags and deleting objects 101. In FIGS. 8–10b, the virtual object VOBJ is depicted as a triangle icon Δ. A phantom line depiction indicates that either movement is occurring or a cut operation has been selected, depending upon the context.

Each of the illustrated implementations can perform in a default mode wherein, once the object appears on the target screen TS 43, it is deemed released or fixed there and the manipulation is complete 42. The user may then perform a conventional on-screen drag (FIG. 1) on the target screen TS or move onto other operations.

Figure 8:
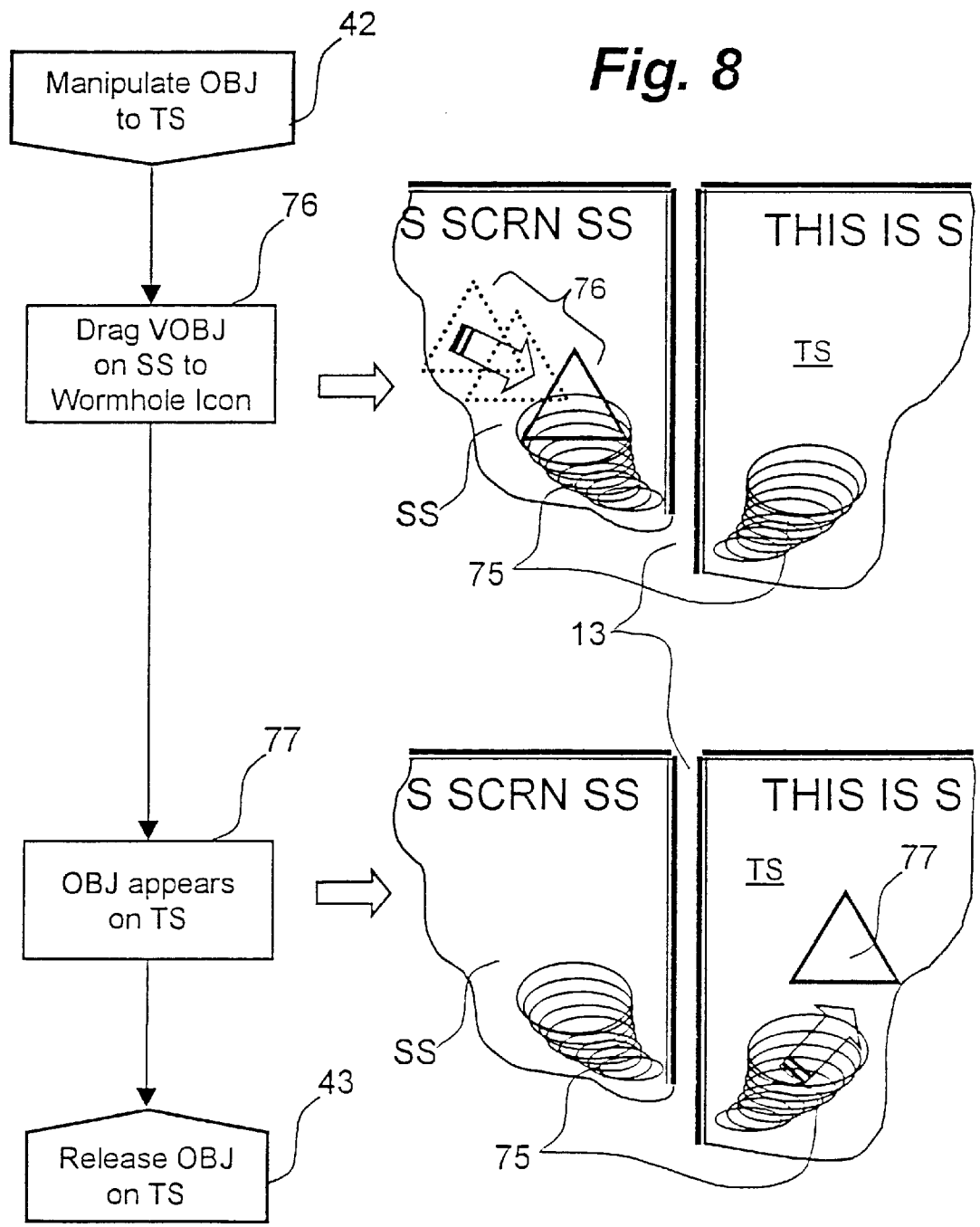
FIG. 8 is a detailed flow diagram of a Wormhole Icon implementation of the hot switch embodiment according to FIG. 5.

Referring to FIG. 8, the depicted icon 75 is an automatic conduit or wormhole to the target screen TS. The user performs an on-screen drag 76 with the pointer 30 on the source touch-screen SS until the virtual object VOBJ impinges the wormhole 75 on the source touch-screen SS. The virtual object VOBJ is automatically routed to the target screen TS and appears at a predetermined position thereon 77. The icon is conveniently a reciprocal return wormhole 75 on the target screen TS for those instances when it acts as the source touch-screen SS. Alternatively, two different wormhole icons (not shown) could be deemed to be a cut or copy icons respectively which simultaneously set cut or copy flags during the manipulation 42.

Figure 9:
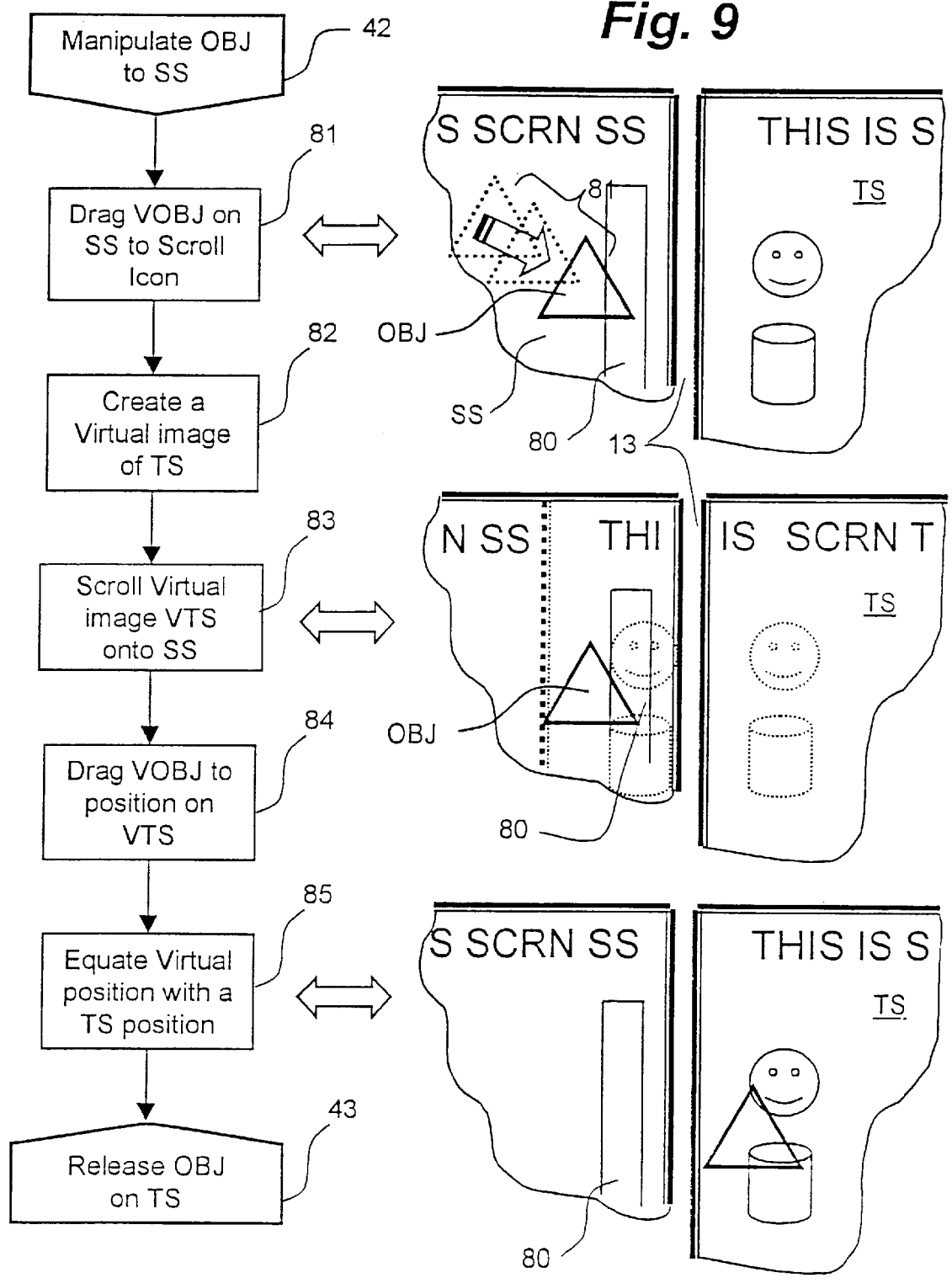
FIG. 9 is a detailed flow diagram of one form of a Scroll Icon implementation of the hot switch embodiment according to FIG. 5.

Turning to FIGS. 9 and 10a, the depicted icons 80 are scroll icons which enable the source touch-screen SS to become a temporary pointing surface for the target screen TS. In the implementation of FIG. 9, the user performs an on screen drag 81 with the pointer 30 contacting the source touch-screen SS until the virtual object VOBJ impinges the scroll bar icon on the source touch-screen SS. A virtual target screen image VTS of the target screen TS is formed 82. Continued impingement between the pointer 30 and the scroll icon causes the VTS to be displayed and to begin to scroll under the virtual object VOBJ on the source touch-screen SS 83. It is anticipated that most users would only perform a small amount of scrolling as necessary to get object VOBJ onto the VTS and drag it into position 84. The degree of impingement or elapsed time of the impingement between object Δ and scroll icon controls the rate and amount of virtual scroll. Small manipulations of the pointer 30 can assist in moving the VTS for more fine positioning. When object OBJ is released 43, the final position of VOBJ on the VTS is determined and an equivalent position is determined on the actual target screen TS 85. Object OBJ is automatically routed to that equivalent position.

An enhanced implementation to that shown in FIG. 9 (not shown), includes mapping or scrolling an entire virtual image VTS of the target screen TS onto the source touch-screen SS and enabling the entire source touch-screen pointer surface SS for dragging the virtual object VOBJ about the virtual target screen VTS.

Turning to FIG. 10a, the user performs an on-screen drag 90 with the pointer 30 on the source touch-screen SS until the virtual object VOBJ impinges a target input icon on SS 92. A second virtual object VOBJ2 is displayed on the target screen TS 93. The small real estate of the target input icon is mapped to the entire display of the target screen TS. Dragging of the pointer 30 and first virtual VOBJ about the target input icon permits gross positioning of the second virtual object VOBJ2 displayed on the target screen TS. When virtual object VOBJ is released, the final position of VOBJ2 on the VTS is determined 95 and an equivalent position is determined on the actual target screen TS 96. Object OBJ is automatically routed to that equivalent position.

For some small PDA touch-screens, the real estate provided by an input icon on the source touch-screen SS may be insufficient and thus like FIG. 9, upon contact of the object and the icon, the entire source touch-screen SS or part thereof is mapped to the target screen TS.

Figure 10B:
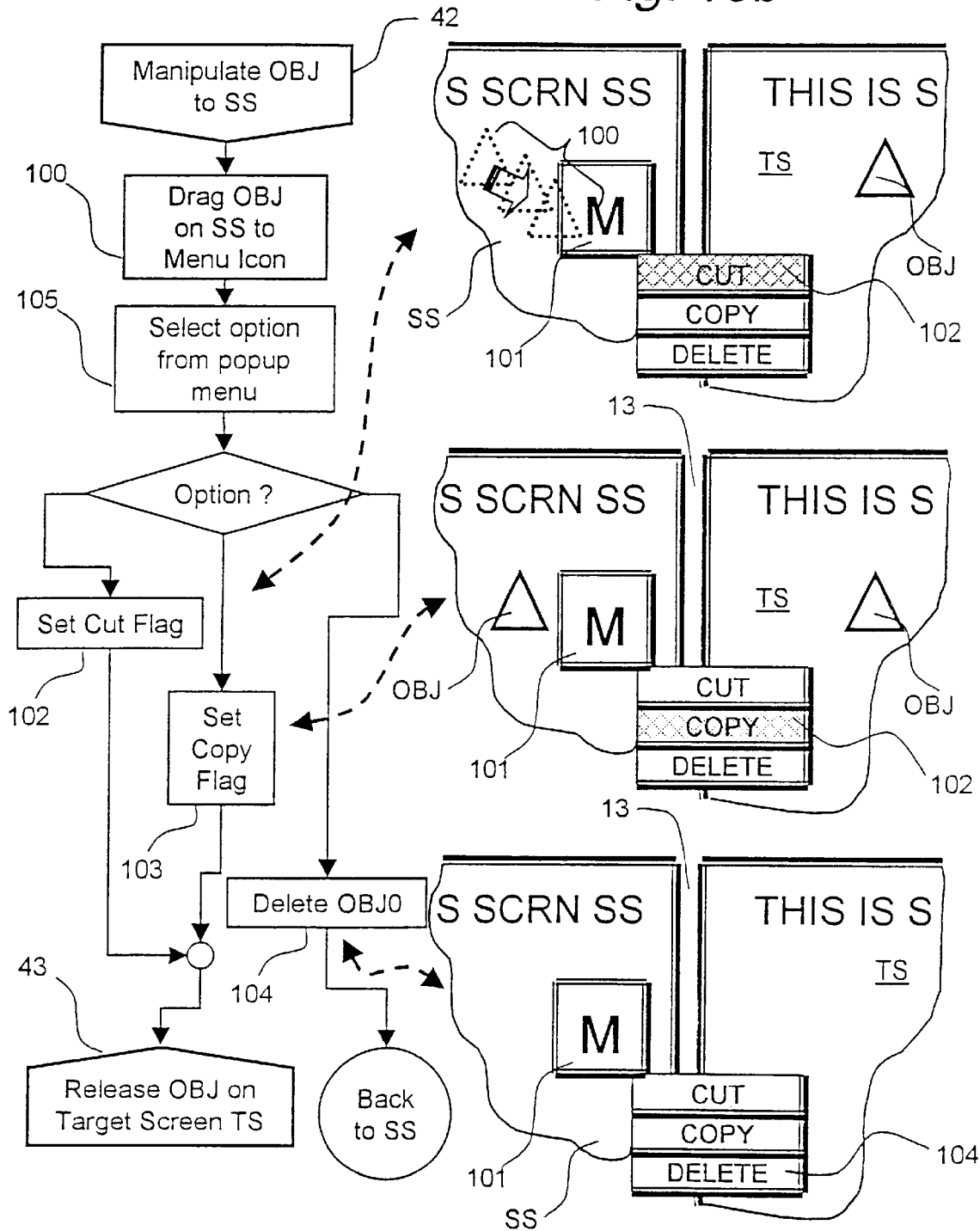
FIG. 10b is a detailed flow diagram of a menu icon implementation of the hot switch embodiment according to FIG. 5.

In FIG. 10b, dragging an object 100 onto a menu icon 101 provides two or more options such as cut 102, copy 103 or delete 104 options for setting the cut/copy flag or deleting OBJ immediately, which may be selected 105. After selecting the cut/copy flag and setting the cut/copy flag, a wormhole process (FIG. 8) can be invoked to direct object OBJ directly to the target screen TS with the appropriate cut or copy function being implemented upon object release 43.

Boundry

Figure 11:
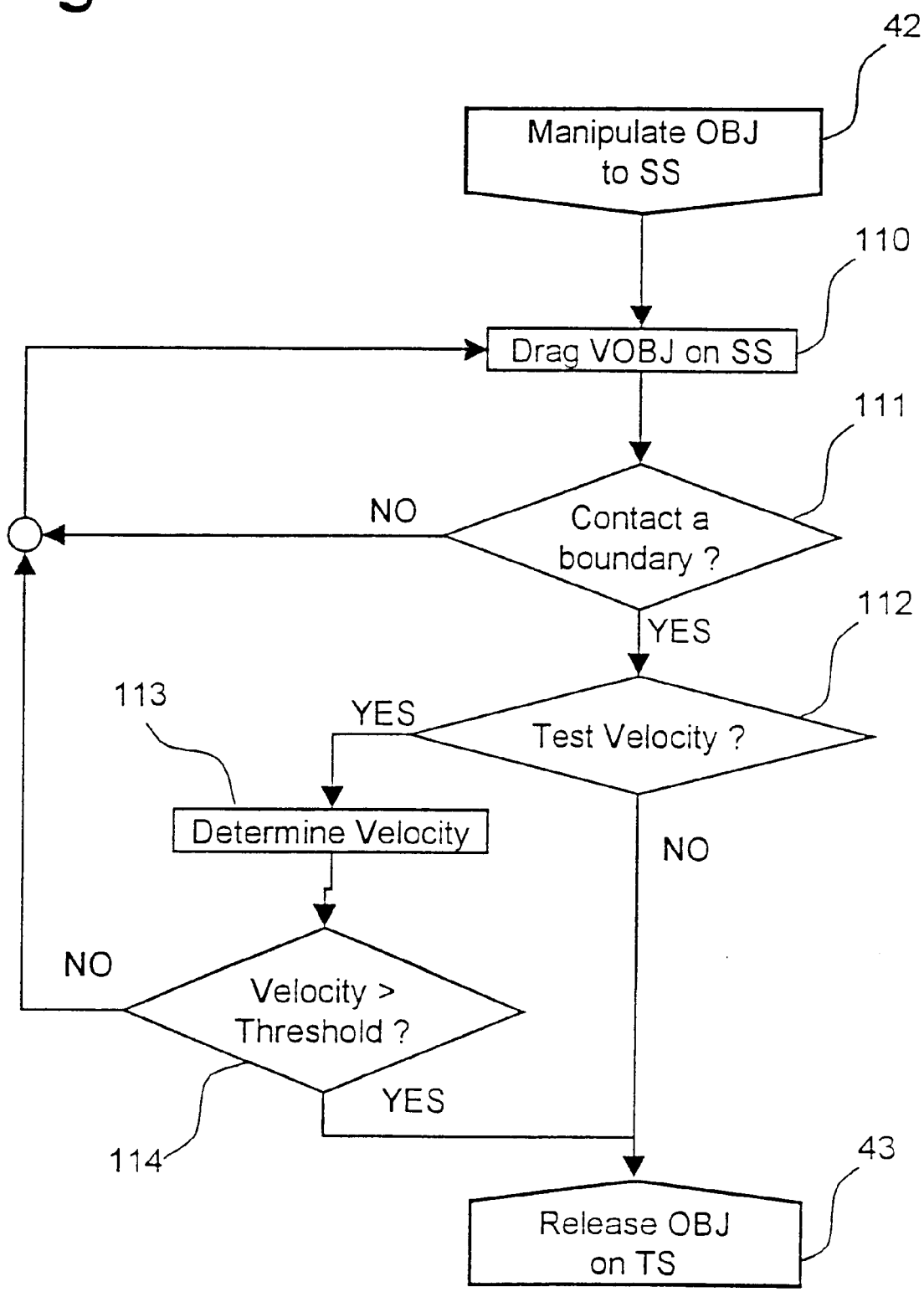
FIG. 11 is a detailed flow diagram of a basic velocity or a screen boundary contact form of the hot switch embodiment according to FIG. 5.

In yet another embodiment, and having reference to FIG. 11, contact between the virtual object VOBJ and a screen boundary (BND) is the trigger for a cross-discontinuity move 42. Any or all boundaries BND can be rendered 'live', however, intuitively, the boundary BND adjacent the discontinuity 13 is used to trigger cross-discontinuity movement 42. Contact with the boundary 111 alone may be sufficient to cause a cross-discontinuity move 42 resulting in the object OBJ being released on the target touch screen TS, however to avoid accidental boundary contacts to result in unwanted cross-discontinuity moves 42, the drag velocity can be monitored. If it is determined that the drag velocity is to be monitored 112, the drag velocity is determined 113 and tested 114 against a preset threshold. If the velocity exceeds the threshold 114 the object OBJ is released on the target touch-screen TS 43. If the velocity threshold is not exceeded, it is assumed that the contact with the boundary is accidental and the object OBJ remains on the source touch-screen SS.

Figure 12:
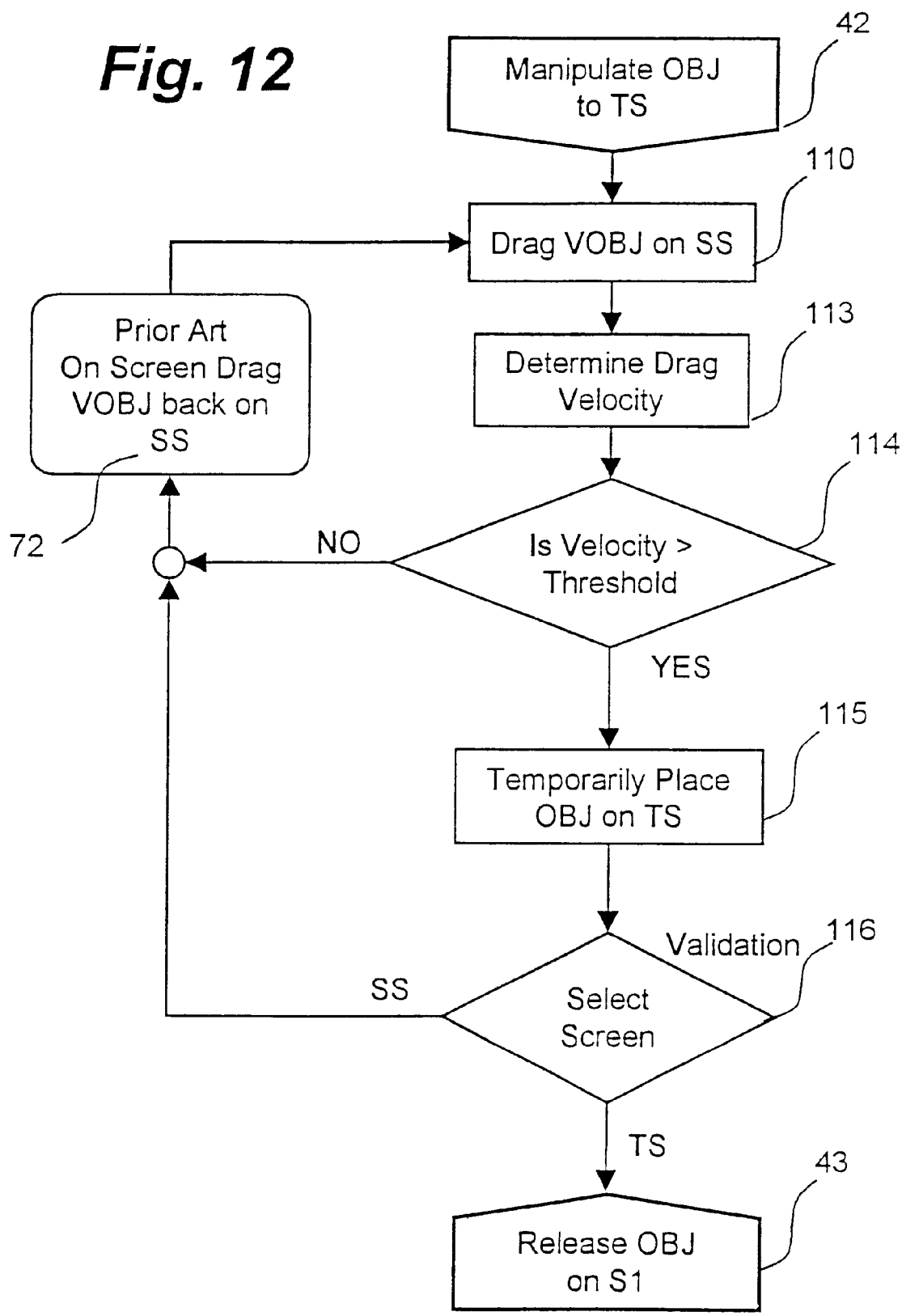
FIG. 12 is a flow diagram of a specific screen boundary contact form of the hot switch embodiment according to FIG. 11.
Figure 13:
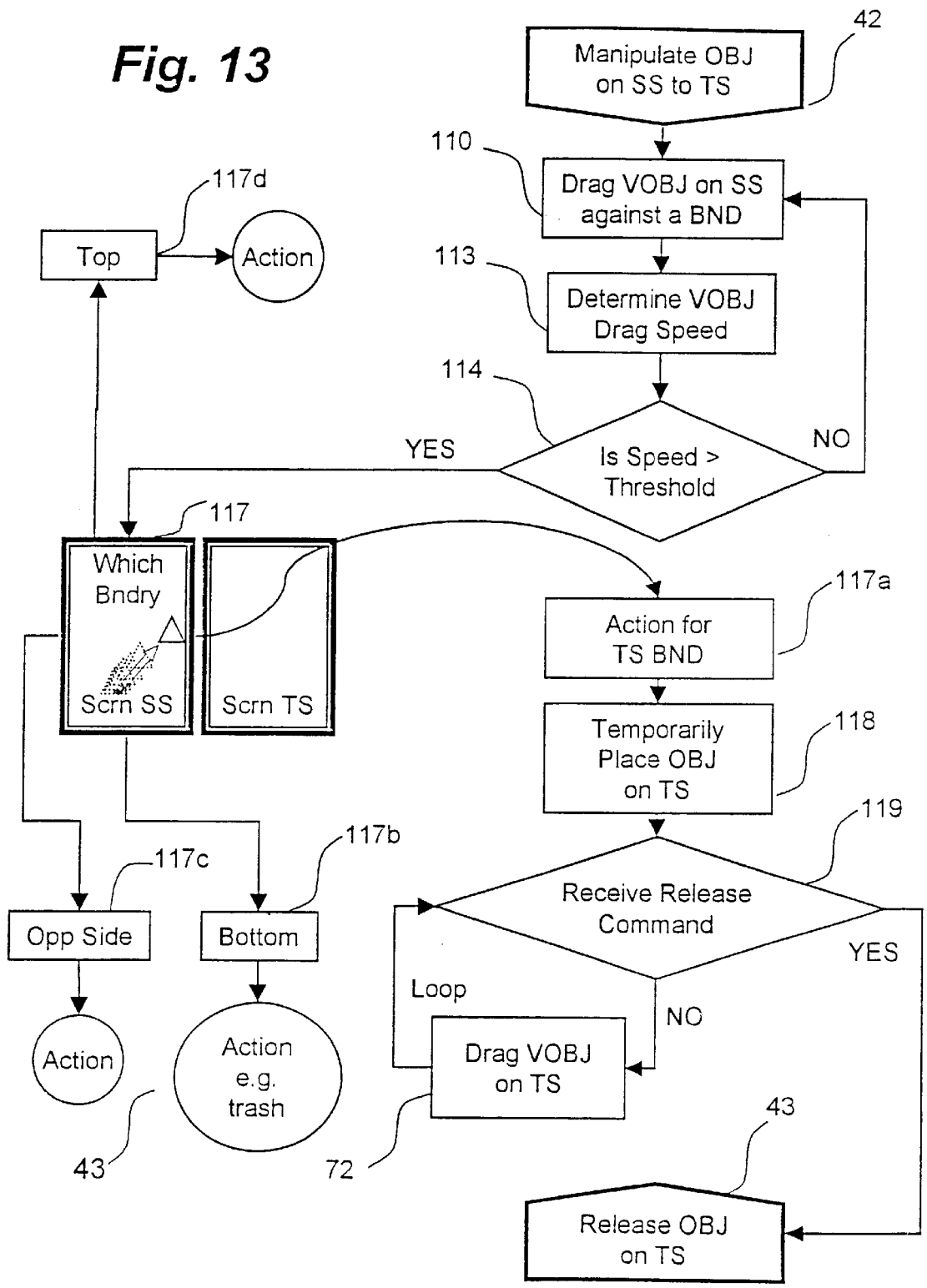
FIG. 13 is a flow diagram of another advanced screen boundary contact form of the hot switch embodiment according to FIG. 11.

More versatile arrangements are shown in FIGS. 12 or 13 where accidental moves are more easily detected and confirmed. Factors of drag velocity and post-move verification are employed. More particularly in FIG. 12, only the velocity of the object drag 113 is determined. If the velocity is slower than a pre-determined threshold 114 then the manipulation is not accepted as a trigger for a cross-discontinuity move and it is merely a Prior art on-screen drag 72. If the velocity is greater than the threshold 114, the virtual object is transferred to the target touch-screen 115 and can remain as a virtual object until contact of the pointer 30 with the target screen TS (validation) 116 or with the source touch-screen SS (abort).

Further, and having reference specifically to FIG. 13, each of the four illustrated boundaries 117a, 117b, 117c, 117d, of the source touch-screen SS can be rendered live and linked to a different action. As was described for the above arrangement (FIG. 12), the action associated with the boundary BND adjacent the target screen TS 117a is deemed to be cross-discontinuity move 42. The bottom boundary 117b could be associated with deletion of the object—a trash bin. Other actions which could be associated with the other boundaries 117c, 117d include sending the object to a floppy drive, as an attachment to e-mail, or for opening by a designated program.

In FIG. 13, as previously described for FIG. 12, an object is dragged against a boundary BND 110. The drag velocity is determined 113. If the velocity exceeds a preset threshold 114, the boundary contacted is assessed 117 to initiate its associated action, as previously described. If the velocity is less than a pre-determined threshold 114 then the manipulation is not accepted as a trigger for a cross-discontinuity move 42 and it is merely a Prior art on-screen drag 72.

If the source touch-screen SS boundary contacted is the boundary adjacent the target touch-screen 117a, the object OBJ is temporarily placed on the target touch-screen 118. If a predetermined release command 119 is given the object is released 43 to the target touch-screen TS. If the release command 119 is not given, OBJ can be dragged further about the target touch-screen TS using a Prior Art on-screen drag 72, until such time as the release command 119 is given and the object OBJ appears 43 on the target touch-screen TS.

Gestures

Referring again to FIG. 5, gestures 120 and enhanced versions of the boundary contact embodiment incorporate interpretation of the movement of the virtual object VOBJ. In the boundary case of FIGS. 11,12,13, the velocity or the drag action is also considered. In gestures 120, the dynamic movement of the dragged object VOBJ is also considered. The element of the drag movement being considered could include either a speed which is sufficient to trigger a move (FIG. 12), or both the speed and direction components of velocity being required.

Figure 14A:
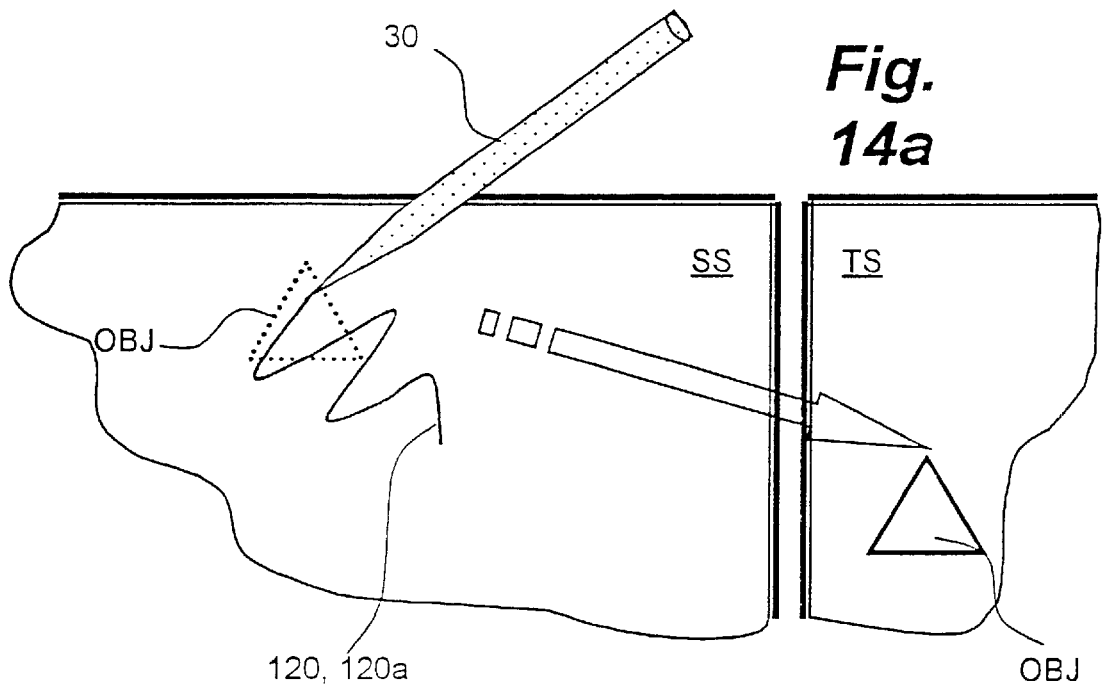
FIGS. 14a–14d are illustrations of gesture implementations of the hot switch embodiment according to FIG. 5. More specifically.
Figure 14B:
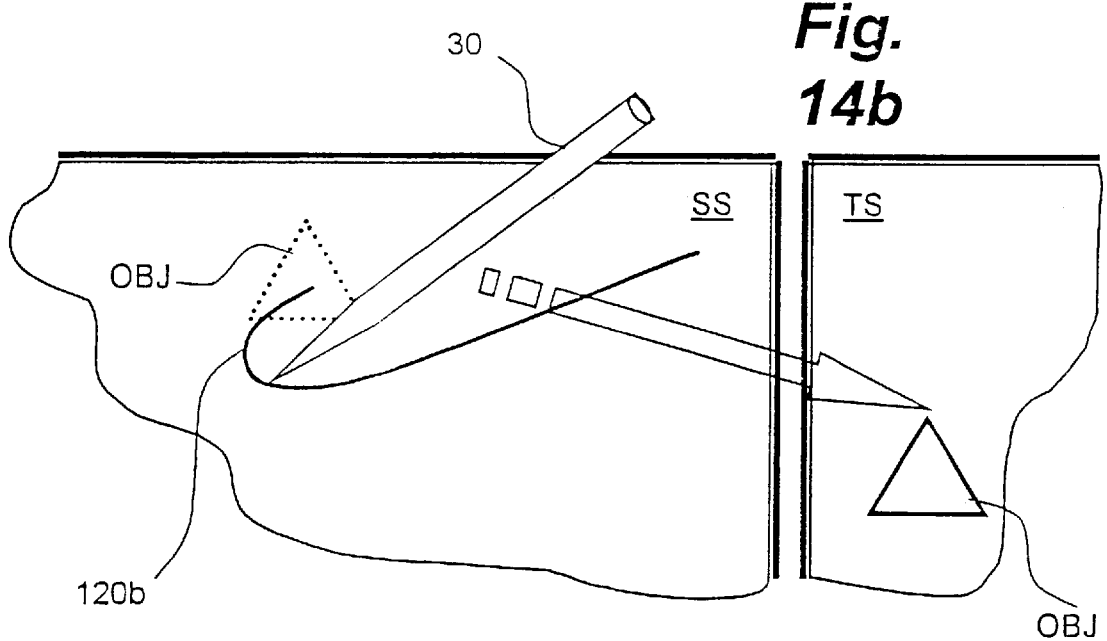

Having reference to FIGS. 14a and 14b, two gestures 120a,120b are illustrated as examples. Ergonomic and intuitive forms of gestures will become standardized over use. As an example, a user may scribble 120a over the object OBJ (FIG. 14a) or quickly scribe a check mark 120b over the object (FIG. 14b), signifying a combination of a cut (cut flag) and wormhole icon type of operation (FIG. 8) for manipulating 42 and then pasting 43 the object to the target touch-screen TS. Accordingly, the object OBJ is moved to the target touch-screen TS and deleted from the source touch-screen SS.

Figure 14C:
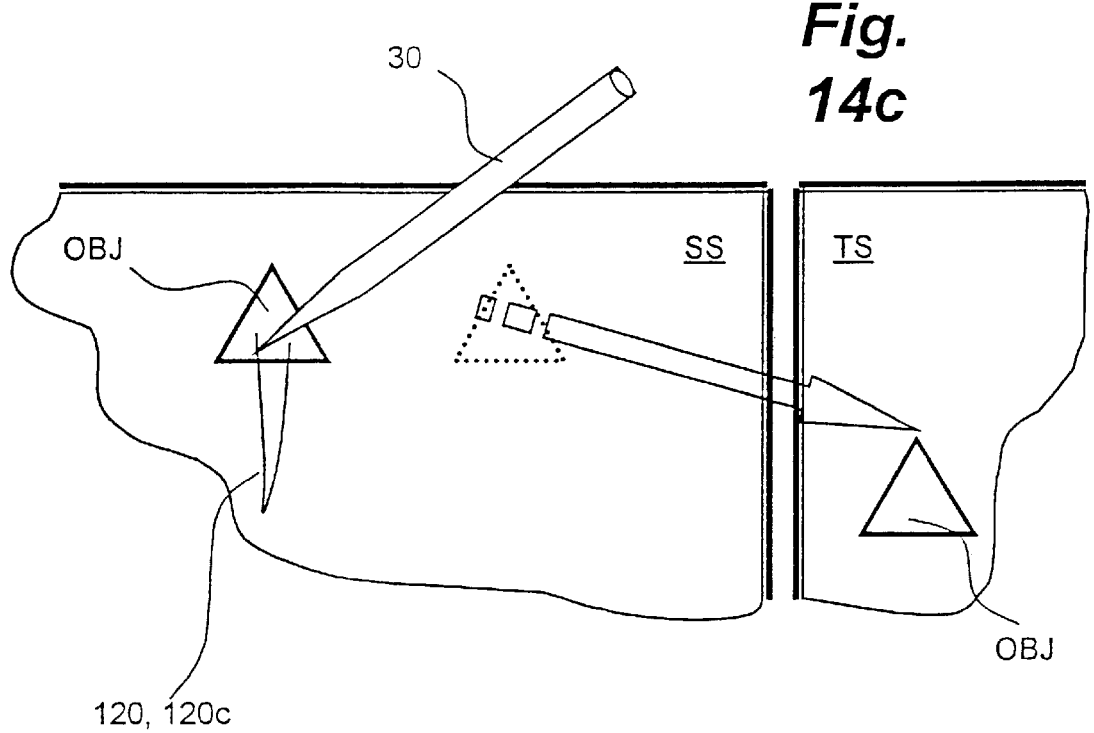
Figure 14D:
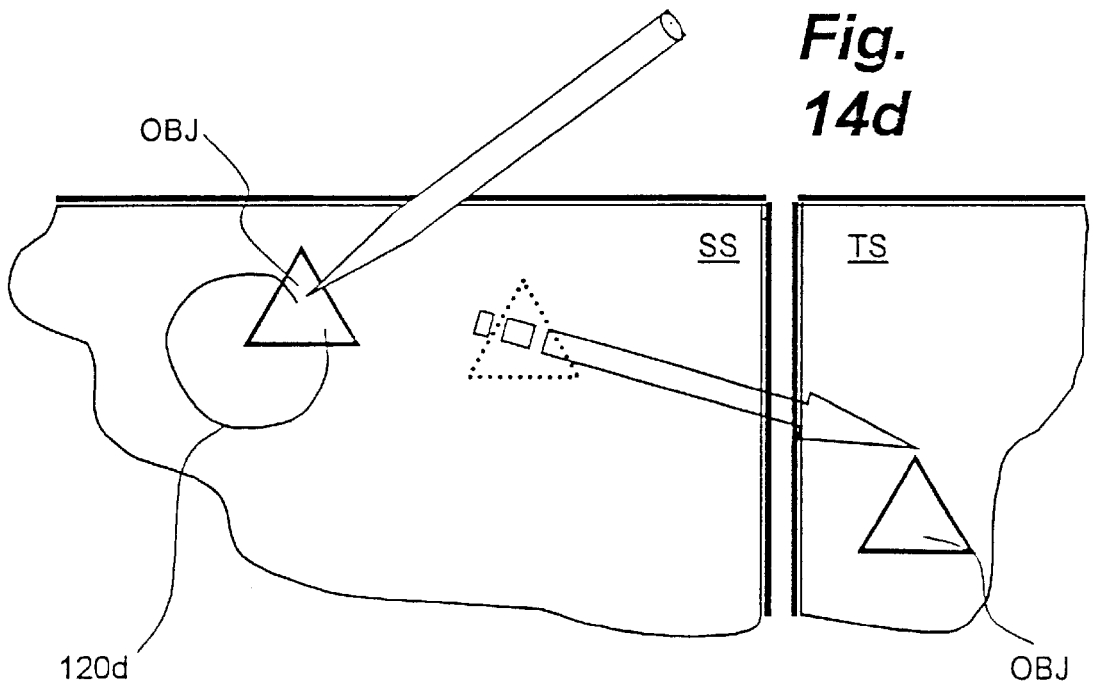

Having reference to FIGS. 14c, and 14d, two additional gestures are illustrated. A user may drag the object OBJ in a circle 120c (FIG. 14c) or otherwise back on itself 120d (FIG. 14d). These gestures 102c,120d signify a combination of a copy and wormhole icon type of operation (FIG. 8) for both pasting the object to the target touch-screen TS and maintaining the object on the source touch-screen SS.

Cut/Copy Flag

In all of the embodiments above, the original object OBJ is maintained on the source touch-screen SS during dragging of the virtual object VOBJ. The virtual object VOBJ is maintained in the buffer until released on the target screen TS. Having reference to FIG. 15, a cut/copy flag is usually set 130, such as by a specific gesture 120, or through a specialized icon 75,80,90,100. If a cut flag 131 is set the original object OBJ is deleted 134 from the source touch-screen when placed or released on the target touch-screen 43. If a copy flag is set 132, the original object OBJ is maintained on the source touch-screen SS when the virtual object VOBJ is released 43 on the target screen TS.

In a software environment, and using the principles set forth in the implementations illustrated in FIGS. 4b and 10b, a software trigger can be used. From a menu 100 (FIG. 10b) or using a cut icon (a specific wormhole icon 75 of FIG. 8), the cut/copy flag can be set 130 to 'cut' and uses the wormhole icon approach to manipulate the virtual object to the target touch-screen TS 42 and delete 134 the original object OBJ from the source touch-screen SS. Selecting copy from a menu or a copy icon performs the same steps but doesn't delete the original object OBJ.

Wireless Stylus

Figure 16:
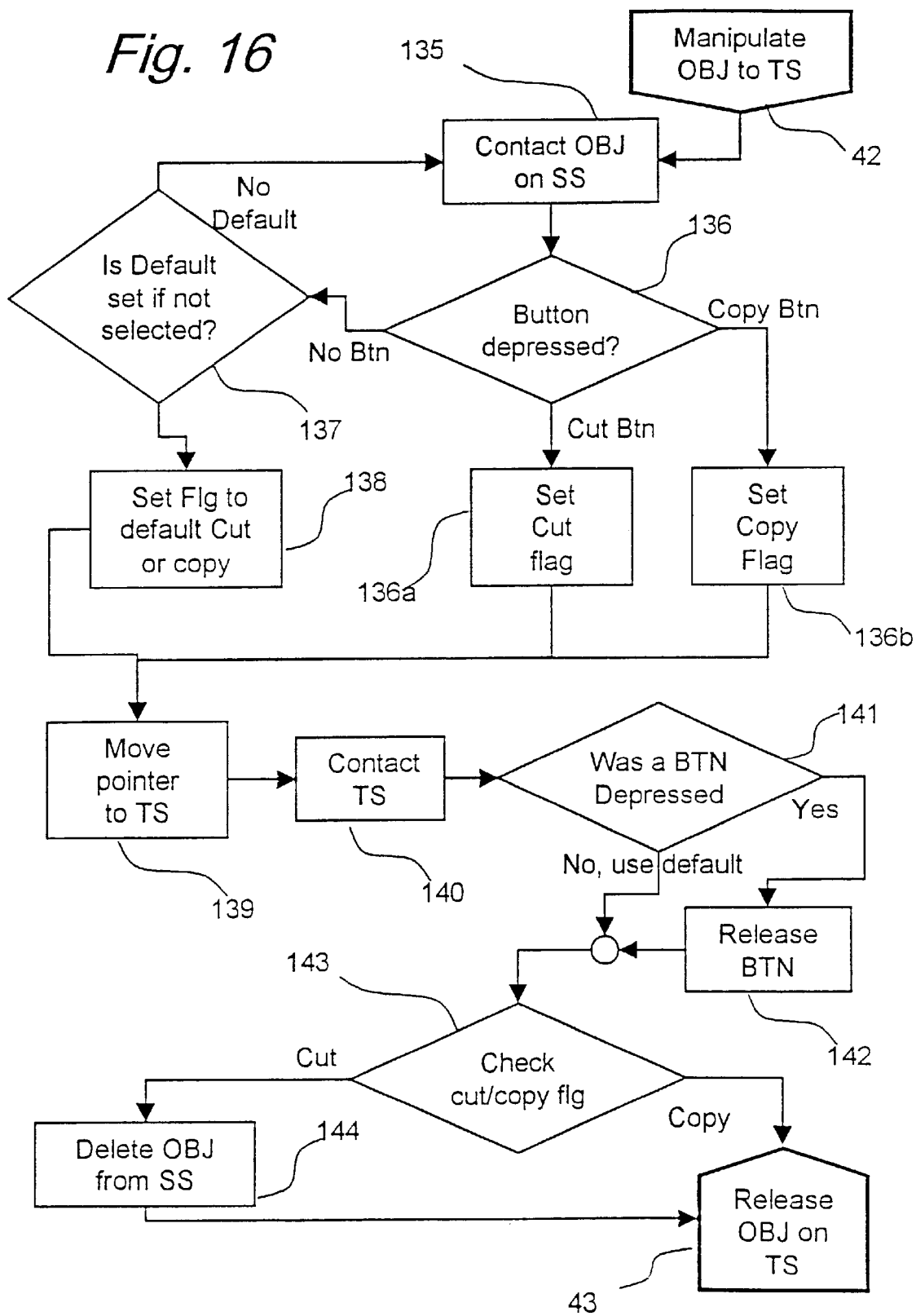
FIG. 16 is a flow diagram illustrating a hardware implementation for setting and then testing for a cut or copy flag when releasing the object.
Figure 17:
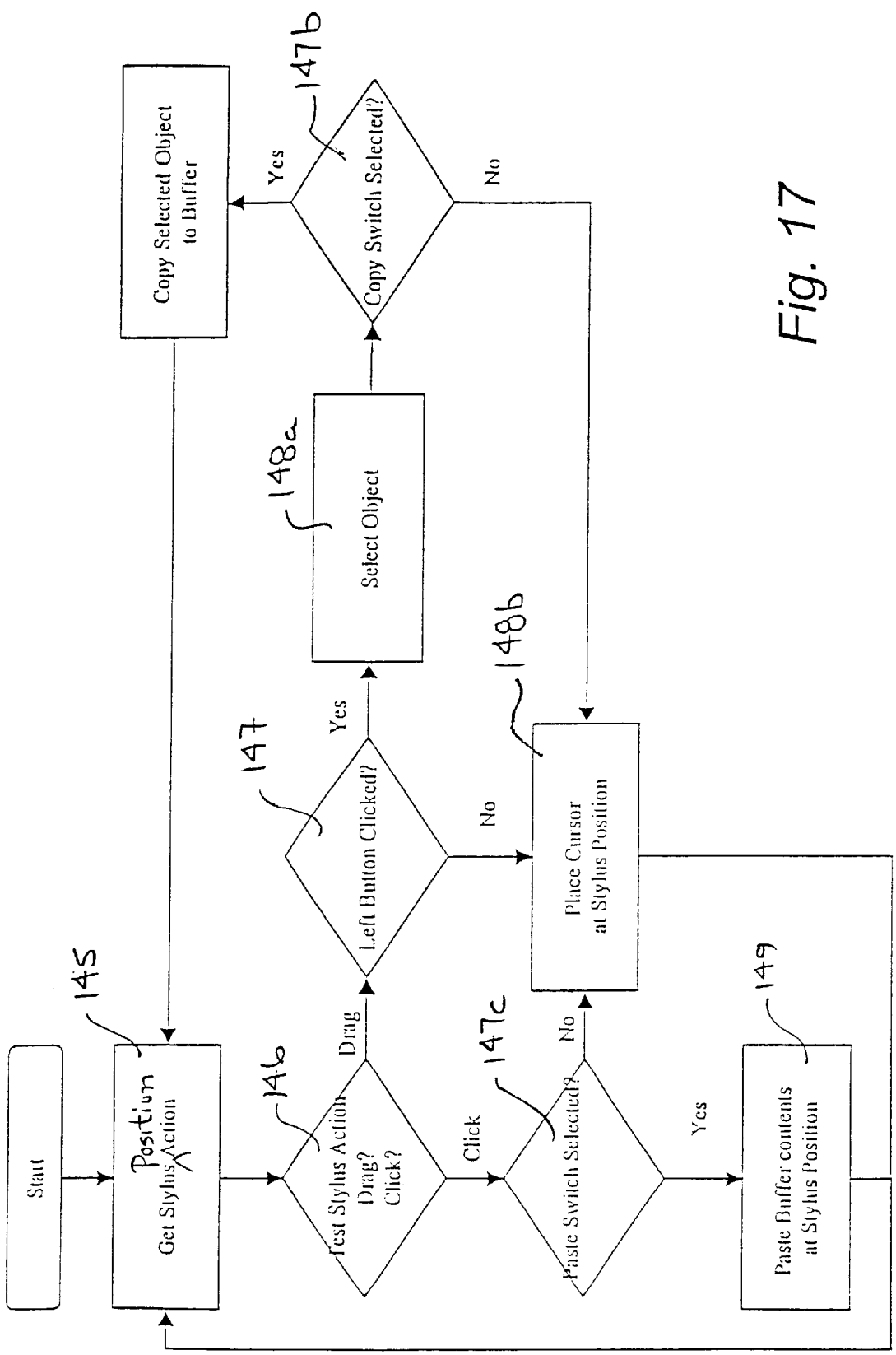
FIG. 17 is a flow diagram of a wireless stylus/hardware implementation of the dual-screen continuity process.

Having reference to FIGS. 15,16,17 a two or three-buttoned wireless stylus 30w (not shown) acts as the pointer 30. The wireless stylus 30w sends its button state information (depressed/not depressed) using known techniques of wireless transmission (i.e. infrared, radio waves, or ultrasonics) for communication (can be bidirectional) of data. Note that proper shielding techniques are required for implementing certain frequencies. Infrared or ultrasonics would not have such a conflict.

In this hardware environment, a hardware trigger, such as a button on the wireless stylus 30w, is used to latch the object in the buffer until released on the target screen TS. Discrete hardware triggers can be assigned as implementing cut or copy functions.

Having reference to FIG. 15, once the object OBJ arrives at the target touch-screen TS, a cut/copy flag is interrogated 133 for establishing whether the object OBJ is deleted 134 or maintained on the source touch-screen SS when the object is released 43. The flag can be set 130 before or after the manipulation 42 (as shown by an additional block 42 intermediate blocks 131 and 132) but must be set (or have a default setting) before being checked 133 and before the object OBJ is released 43.

Having reference to FIG. 16, the wireless stylus 30b is contacted 135 to the source touch-screen SS. If a button was depressed 136, the particular function of that button is determined, cut 136a, or copy 136b ad the cut/copy flag is set. If no button was depressed 137, a default cut or copy flag and action 138 may be assigned. Once the action is determined, the user can move 139 the pointer to the target screen TS. When TS is contacted 140, the status of the buttons is checked 141. If depressed, the process awaits the release of the button 142. One option if the user continues to depress the button is to perform an on-target touch-screen TS drag until release. If not depressed, the process continues with the defaults. The cut/copy flag is checked 143 and if cut, then the object is released to the target touch-screen TS 43 and deleted 144 from the source touch-screen.

In a generic form, the operating system has operating systems extensions which monitor the action of the stylus and its position, be it on the source of target screens SS,TS. Turning to FIG. 17, the well-known standards used for mouse-input devices is mimicked using a 'left' button for all 'select' operations; a 'middle' button (absent in a two-button stylus) for fast navigation within an open document; and a 'right' button to invoke 'context' menus. The operating system or application program extension employs a get stylus action 145, whether a button of the stylus has been depressed (clicked) and whether the stylus is being dragged 146, and specifically which button has been depressed. Additional buttons may be used to designate 147a cut, 147b copy, or 147c paste. Paste is typically designated by a released of the depressed button.

Use of this three-button wireless stylus 30w solves the problem of having a physically discontinuous pointing interface. For drag and drop of objects, the user taps or contacts the wireless stylus 30b on the source touch-screen SS while depressing and holding the left button, the user can highlight and drag the stylus to select an object. Specifically, the stylus action is checked 146 and if a left button is clicked 147 and the stylus is being dragged on a screen, then the object is selected 148 and the object's parameters are copied into the buffer. The stylus action is continued to be monitored 145 which may be an on-screen action or a cross-discontinuity action by repeating step 146 and 147. Once selected, the user can move the selected object by continuing to press the 'left' button, lifting and moving the stylus to the surface of the target touch-screen TS, and contacting it at the desired location, and finally releasing the 'left' button. The system determined the stylus position 148. At this point, when the stylus action is checked 145, if a pasted button is clicked or the left button released, then the buffer is pasted to the screen contacted by the stylus 149. If the target screen is contacted, then the object is pasted there as a cross-discontinuity drag.

If the contacted screen is the source touch-screen, then only a known on-screen drag is performed.

For specific cut, copy and paste operations, once selected, the user can cut/copy the selected object to the internal buffer by pressing down the 'right' menu button 147b and selecting the 'cut/copy' option from a 'context' menu that is displayed. Conveniently the menu appears adjacent to the stylus 30b although it could appear anywhere on the screens 11,12. The user can then paste 147c the selected object by touching the surface of the target screen at the desired location, pressing down the 'right' button and selecting the 'paste' option from the 'context' menu.

Eye-Tracking and Voice Recognition

Figure 18:
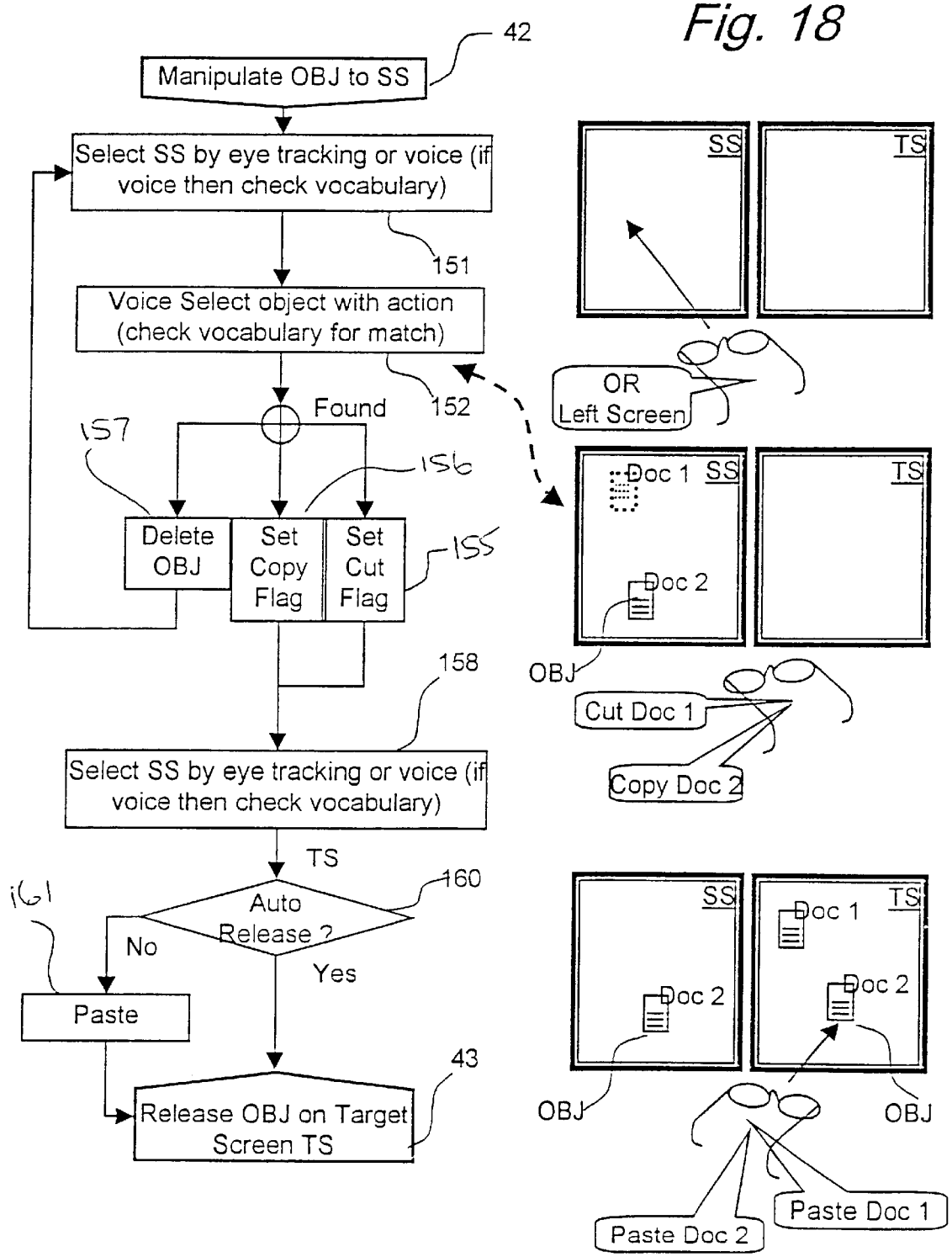
FIG. 18 is a flow diagram of a combination eye-tracking and voice recognition implementation of the dual-screen continuity process.

The addition of other input interfaces can aid further in enabling cross-discontinuity manipulation of objects. As the discontinuity interferes with the fluidity of a contact drag, non-contact drag implementations are also provided. As shown in FIGS. 18 and 19, two such implementations are eye-tracking and voice recognition.

Eye tracking is used for assessing quantitatively where a person is focussing their attention and can be used to direct certain operations. In U.S. Pat. No. 5,844,824 to Newman et al., the inventors refer to use of a visual trackball, demonstrated by the US Navy, for selecting an item merely by looking at it. A tracker is fitted to the user and is calibrated for the user and the display. The tracker uses relative pupil and eye movement to perform the tracking. Others, utilize eye tracking without need for a headset such as U.S. Pat. No. 5,638,176 to Hobbs et al. which uses an eye-safe diode laser which can be positioned at the display and uses the interference fringes between corneal glint and the "red-eye" retinal reflection to obtain a viewing vector.

Accordingly, it is clear that a screen 11,12 can be selected and even an object OBJ on the source touch-screen SS. The eye can be tracked from screen to screen and form a means to perform a continuous drag from the source to the target screen SS,TS.

Where ambiguity regarding the action may exist, e.g. whether to cut or copy the selected object, voice recognition algorithms can be used. The means for implementing voice recognition is known to those of ordinary skill and has been applied in the context of computer operation, particularly to convert speech to word-processing documents.

Turning to FIG. 18 a user can select the screen using eye tracking techniques and specify which of the objects displayed thereon will be manipulated. As illustrated, an object representing a first document (DOCL) is cut from the source touch-screen SS and is pasted to the target screen TS. Also, an object representing a second document (DOC2) is copied from the source touch-screen SS and is pasted to the target screen TS. The target screen TS is selected using eye-tracking. More particularly, the screen SS is selected using eye-tracking or by voice. If by voice, the voice command issued will be parsed for a screen identifier and compared against known screen vocabulary. Once the screen SS is selected 151, the user voice-selects the object 152. The computer parses the voice phrase for recognizing a parameter unique to the object DOC1 or DOC2 153. If no object matches then the user is prompted to voice the command again 152. If parsed phrase is recognized as containing an action 154 which matches a predetermined vocabulary (cut 155, copy 156, delete 157) then the appropriate cut/copy/delete flag is set. If no action is found, a default is applied or, the user is prompted again to voice the command 152. If found, the objects parameters and the action 155,156,157 are stored in the buffer awaiting release. Selection is conveniently signified by the creation of a displayed virtual object VOBJ. Then the user selects a target screen TS at 158 which can automatically signal release thereto 160 or it may require verification by a second voice command 161, for recognition of a paste command 162 from the predetermined vocabulary and finally release 43 to the target screen TS.

Turning to FIG. 19, as for FIG. 18, a user can select the screen using eye tracking or voice recognition techniques and specify which of the objects displayed thereon will be manipulated 151. As illustrated, an object representing a first document (DOC1) is copied from the source touch-screen SS and is pasted to the target screen TS. More particularly, once the screen SS is selected 151, the user voice-selects the object 165. The computer parses the voice phrase for recognizing a parameter unique to the object DOC1 166. If no object matches then the user is prompted to voice the command again 165. If found, the objects parameters and the action 155,156,157 are stored in the buffer awaiting release. A displayed virtual object VOBJ is created. The user looks to the target screen 167. The action of looking to the target screen is tracked and an eye-rag velocity determined. As with contact dragging described above, the velocity of the drag action is determined 168 and compared to a threshold 169. If below the threshold velocity, DOC1 is released to the source screen and reselection is required 151. If the drag velocity is above the threshold, DOC1 is transferred to target screen which can automatically signal release 170 or may require verification 171, and finally release 43 to the target screen TS.

Although certain preferred embodiments have been described above, changes and modifications can be made without departing from the scope of the claims. For example, the possibilities for varying the type and action of hot switches are many, some of which have been disclosed herein and many which have not, but all employ the elements as claimed.

The embodiments of the invention in which an exclusive property or privilege is claimed are defined as follows:

1. Apparatus for manipulating a first object between discontinuous source and target touch-screens of a computer comprising:
   a single virtual display, the first object being displayed on the source touch-screen and being known in the virtual display by unique parameters,
   a buffer in the computer for storing the unique parameters of the first object;
   means for triggering manipulation of the first object from the source touch-screen to the target touch-screen;
   means for releasing the first object's parameters from the buffer for display of the first object on the target touch-screen; and
   program means on the computer for selecting the first object upon a contact action of a pointer and the source touch-screen, for implementing the triggering manipulation means, and for implementing the releasing means.

2. The apparatus as recited in claim 1 wherein the program means further comprises means for recognizing a predefined contact action of the pointer upon, and restricted to, the source touch-screen.

3. The apparatus as recited in claim 1 wherein the program means further comprises a software latch for maintaining the first object in the buffer despite loss of contact between the pointer and the source touch-screen.

4. The apparatus as recited in claim 3 wherein the software latch further comprises a timer having a predetermined timeout so that the releasing means only release the first object's parameters from the buffer if actuated before the timer's timeout.

5. The apparatus as recited in claim 4 wherein the means for releasing the first object further comprises contact between the pointer and the target touch-screen.

6. The apparatus as recited in claim 2 wherein the predefined contact action of the pointer is to drag the pointer and the first object to predetermined co-ordinates while the pointer remains in contact with the source touch-screen, the arrival of the pointer at said predetermined co-ordinates activating the triggering manipulating means.

7. The apparatus as recited in claim 6 further comprising means for displaying a temporary second object on the virtual display, the second object representing the buffer and which is draggable on the virtual display.

8. The apparatus as recited in claim 7 wherein the predetermined co-ordinates on the source touch-screen arm along a boundary of the source touch-screen.

9. The apparatus as recited in claim 7 wherein the predetermined co-ordinates on the source touch-screen are at co-ordinates of a third object displayed on the source touch-screen.

10. The apparatus as recited in claim 2 wherein the predefined contact action of the pointer is a gesture, the apparatus further comprising:

gesture-recognition means for comparing the gesture of the pointer on the source touch-screen with predefined gestures and wherein if a gesture is recognized as being one of the predefined gestures the triggering manipulation means is activated for manipulating the first object to the target touch-screen.

11. Apparatus for manipulating a first object between discontinuous source and target screens of a single virtual display of a computer, the first object being displayed on the source screen and being known in the virtual display by unique parameters, comprising:

means for selecting the first object on the source screen;

a buffer for storing the first objects parameters when it is selected;

means associated with the source screen which, when activated by the user through a predefined motion of the pointer, upon and restricted to the source touch-screen, for manipulating the first object from the source screen to the target screen; and means, which when actuated, release the first object's parameters from the buffer for display of the first object on the target screen;

microphone means for receiving voice commands and emitting digitized voice signals; and voice recognition means for receiving and recognizing digitized voice signals and for determining if a voice command is recognized as having identified a unique parameter of the first object and if a voice command is recognized as having identified a source screen and wherein the means for selecting the first object comprises determining if the identified first object is displayed on the identified source screen.

12. The apparatus as recited in claim 11 further comprising:

an eye-tracking interface for detecting which of the source or target screens is being watched by the user; and wherein the means for selecting the first object comprise determining if the identified first object is displayed on the identified source touch-screen.

13. A process for manipulating a first object between discontinuous source and target touch-screens of a single virtual display of a computer, the first object being displayed on the source touch-screen and being known in the virtual display by unique parameters, the process comprising the steps of:

selecting the first object from the source touch-screen when the first object is contacted by a pointer;

storing the first object's unique parameters in a buffer in the computer when it is selected;

applying a program on the computer to sense contact of the pointer to the touch-screens and for triggering manipulation of the first object from the source touch-screen to the target touch-screen; and releasing the first objects parameters from the buffer for display of the transferred first object to the target touch-screen.

14. The process as recited in claim 13 wherein the first object is manipulated to the target touch-screen by latching the first object's stored parameter's in the buffer and maintaining them therein until released to the target touch-screen despite lifting of the pointer from contact with the source touch-screen.

15. The process as recited in claim 14 further comprising:

initiating a timer upon latching the buffer, the timer having a predetermined timeout; and releasing the first object's parameters to the target touch-screen before the timer reaches timeout.

16. The process as recited in claim 13 further comprising:

setting a cut flag which specifies that the first object is to be deleted after release to the target touch-screen;

checking the state of the cut flag upon releasing the first object's parameters to the target touch-screen; and deleting the first object from the source touch-screen if the cut flag is set.

17. The process as recited in claim 13 wherein the releasing of the first object's parameters from the buffer comprises touching the pointer to the target touch-screen.

18. The process as recited in claim 13 wherein the first object is manipulated to the target touch-screen by:

defining a hot switch zone on the source touch-screen;

dragging the pointer and selected first object across the source touch-screen; and impinging the first object with the hot switch zone for transferring the first objector to the target touch-screen.

19. The process as recited in claim 18 wherein the hot switch zone is a boundary of the source touch-screen.

20. The process as recited in claim 13 wherein the first object is manipulated to the target touch-screen by:

dragging the pointer and first object across the source touch-screen;

comparing the velocity of the dragged first object against a predetermined drag velocity and if velocity is greater than the predetermined drag velocity then the first object is transferred to the target touch-screen.

21. The process as recited in claim 18 further comprising:

comparing a velocity of the first object when it impinges the hot switch zone against a predetermined drag velocity and if the first object's velocity is greater than the predetermined drag velocity then the first object is transferred to the target touch-screen.

22. The process as recited in claim 18 wherein the hot switch zone is a third object displayed on the source touch screen.

23. The process as recited in claim 22 further comprising forming a virtual second object on the target touch-screen when the first object impinges the third object;

mapping the source touch-screen to the display on the target touch-screen;

dragging the pointer over the source touch-screen for dragging the virtual second object over the target touch-screen so that, when the first object is released, the first object is transferred to the target touch-screen to the location of the virtual second object upon release.

24. The process as recited in claim 22 further comprising:

displaying a virtual target screen on the source touch-screen when the first object impinges the third object; and dragging the pointer over the source touch-screen for scrolling the virtual target screen progressively under the first object on the source touch-screen so that, when the first object is released, the first object is transferred to the target touch-screen to a location corresponding to where the first object was located over the virtual target screen.

25. The process as recited in claim 18 further comprising:

displaying a menu of options when the first object impinges the hot switch zone; and selecting an option from the menu so that the first object is transferred to the target touch-screen according to the menu option.

26. The process as recited in claim 25 wherein one menu option is a copy option for transferring and releasing the first object to the target touch-screen while leaving a copy of the first object on the source touch-screen.

27. The process as recited in claim 25 wherein one menu option is a cut option for:

for transferring and releasing the first object to the target touch-screen; and deleting the first object from the source touch-screen.

28. The process as recited in claim 13 wherein the first object is manipulated to the target touch-screen by:

dragging the pointer across the source touch-screen as a gesture;

comparing the gesture against pre-determined gestures so that if it matches a known pre-determined gesture then the first object is transferred onto the target touch-screen.

29. The process as recited in claim 28 wherein the gesture matches a pre-determined copy gesture so that the first object is transferred to the target touch-screen and when released thereto, a copy of the first object remains on the source touch-screen.

30. The process as recited in claim 28 wherein the gesture matches a pre-determined cut gesture so that the first object is transferred to the target touch-screen and when released thereto, the first object is deleted from the source touch-screen.

31. The process as recited in claim 13 further comprising the steps of:

providing a wireless pointer having one or more buttons, the state of buttons being determinable;

touching the pointer to the source touch-screen to select the first object;

actuating a first button on the wireless pointer for latching the first object's parameters in the buffer and maintaining them there until released;

touching the wireless pointer to the target touch-screen at a release point where the second object is to be dragged to; and actuating the first button for releasing the first object to the target touch-screen.

32. The process as recited in claim 31 further comprising:

actuating a second button on the pointer for displaying a context option menu on either of the source and target touch-screens;

touching the context menu for selecting a first option manipulation therefrom;

touching the pointer to the target touch-screen at a location where the first object is to be released;

actuating the second button on the wireless pointer for displaying the context menu; and touching the context menu for selecting a second option therefrom for transferring and releasing the first object to the target touch-screen at the released location.

33. The process as recited in claim 32 wherein an option from the context menu is a copy option so that when the first object is transferred and released to the target touch-screen, a copy of the first object remains on the source touch-screen.

34. The process as recited in claim 32 wherein an option from the context menu is a cut option so that when the first object is transferred and released to the target touch-screen, the first object is deleted from the source touch-screen.

35. The process as recited in claim 13 wherein the first object is selected by:

providing a predetermined voice vocabulary;

providing means for recognizing voice commands by comparing them with the predetermined vocabulary;

receiving voice commands from the user;

recognizing the voice commands for comparing the voice commands for a match against a predetermined vocabulary;

determining if a vocabulary match identifies a unique parameter of an object on the touch-screen; and selecting the object as the first object if the object having the recognized unique parameter is displayed on the source touch-screen.

36. The process as recited in claim 13 further comprising the steps of:

providing an eye-tracking interface;

detecting if a touch-screen is being watched by the user using the eye-tracking interface;

selecting the detected touch-screen as being the source touch-screen.

37. The process as recited in claim 36 wherein the first object is manipulated for transferring it from the source touch-screen to the target touch-screen by:

tracking the eyes of the user as the user looks from the source touch-screen to the target touch-screen for detects a cross-discontinuity drag; and releasing the first object's parameters from the buffer for display of the transferred first object to the target touch-screen.

* * * * *